United States Patent
Riedl et al.

(10) Patent No.: US 8,959,563 B2
(45) Date of Patent: *Feb. 17, 2015

(54) METHODS AND APPARATUS FOR REVENUE-OPTIMIZED DELIVERY OF CONTENT IN A NETWORK

(75) Inventors: Steven Riedl, Superior, CO (US); Bryan Santangelo, Stillwater, OK (US); Gabe Zimbelman, Arvada, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/351,185

(22) Filed: Jan. 16, 2012

(65) Prior Publication Data

US 2012/0185899 A1    Jul. 19, 2012

Related U.S. Application Data

(63) Continuation of application No. 11/974,700, filed on Oct. 15, 2007, now Pat. No. 8,099,757.

(51) Int. Cl.
| | |
|---|---|
| H04N 7/16 | (2011.01) |
| H04N 7/173 | (2011.01) |
| H04N 21/24 | (2011.01) |
| H04N 21/262 | (2011.01) |
| H04N 21/472 | (2011.01) |
| H04N 21/647 | (2011.01) |
| H04N 21/482 | (2011.01) |
| H04N 21/2385 | (2011.01) |

(52) U.S. Cl.
CPC ..... *H04N 21/26216* (2013.01); *H04N 21/2402* (2013.01); *H04N 21/47202* (2013.01); *H04N 21/64738* (2013.01); *H04N 21/2405* (2013.01); *H04N 21/26225* (2013.01); *H04N 21/482* (2013.01); *H04N 21/2385* (2013.01)

USPC .......................................................... 725/116

(58) Field of Classification Search
CPC .................. H04N 21/23439; H04N 21/23614; H04N 21/2365; H04N 21/2368; H04N 21/2385; H04N 21/2393; H04N 21/2402; H04N 21/2407; H04N 21/252; H04N 21/25808; H04N 21/25883; H04N 21/26216; H04N 21/26225
USPC .................................... 725/114–116, 144–146
See application file for complete search history.

(56) References Cited

U.S. PATENT DOCUMENTS

| | | | |
|---|---|---|---|
| 5,774,170 A | 6/1998 | Hite et al. | |
| 6,002,393 A | 12/1999 | Hite et al. | |
| 6,134,532 A | 10/2000 | Lazarus et al. | |
| 6,463,585 B1 * | 10/2002 | Hendricks et al. | 725/35 |

(Continued)

*Primary Examiner* — Dominic D Saltarelli
(74) *Attorney, Agent, or Firm* — Gazdzinski & Associates, PC

(57) ABSTRACT

Methods and apparatus for optimizing the distribution and delivery of multimedia or other content within a content-based network. In one embodiment, the network comprises a broadcast switched cable television network, which utilizes a Network optimization controller (NOC) that processes subscriber program viewing requests to identify options available to fulfill the request (including, e.g., the creation of one or more "microcasts" specifically targeting one or more users), and evaluate these options to determine one that optimizes network operation. The NOC performs these decisions by considering various parameters including network resource availability, type of CPE, subscriber's targeted advertisement profile, and business rules programmed by operator of the network. Business methods based on such network optimization are also described.

26 Claims, 21 Drawing Sheets

(56) References Cited

U.S. PATENT DOCUMENTS

| | | |
|---|---|---|
| 6,718,551 B1 | 4/2004 | Swix et al. |
| 6,738,978 B1 | 5/2004 | Hendricks et al. |
| 7,075,945 B2 | 7/2006 | Arsenault et al. |
| 7,143,431 B1 | 11/2006 | Eager et al. |
| 7,228,555 B2 | 6/2007 | Schlack |
| 7,246,172 B2 | 7/2007 | Yoshiba et al. |
| 7,317,728 B2 | 1/2008 | Acharya et al. |
| 7,327,692 B2 | 2/2008 | Ain et al. |
| 7,352,775 B2 | 4/2008 | Powell |
| 7,355,980 B2 | 4/2008 | Bauer et al. |
| 7,363,371 B2 | 4/2008 | Kirkby et al. |
| 7,577,118 B2 | 8/2009 | Haumonte |
| 7,602,820 B2 | 10/2009 | Helms |
| 2001/0013123 A1 | 8/2001 | Freeman et al. |
| 2002/0049902 A1 | 4/2002 | Rhodes |
| 2002/0087976 A1* | 7/2002 | Kaplan et al. .................. 725/34 |
| 2002/0123928 A1 | 9/2002 | Eldering et al. |
| 2003/0056217 A1 | 3/2003 | Brooks |
| 2003/0217365 A1 | 11/2003 | Caputo |
| 2004/0078809 A1* | 4/2004 | Drazin ............................ 725/34 |
| 2005/0039205 A1 | 2/2005 | Riedl |
| 2005/0060742 A1 | 3/2005 | Riedl |
| 2005/0060745 A1 | 3/2005 | Riedl |
| 2005/0086691 A1 | 4/2005 | Dudkiewicz et al. |
| 2005/0114900 A1 | 5/2005 | Ladd |
| 2006/0036750 A1 | 2/2006 | Ladd |
| 2006/0171390 A1* | 8/2006 | La Joie ........................ 370/390 |
| 2006/0171423 A1 | 8/2006 | Helms |
| 2006/0218604 A1 | 9/2006 | Riedl |
| 2006/0248555 A1 | 11/2006 | Eldering |
| 2006/0253328 A1 | 11/2006 | Kohli et al. |
| 2006/0253864 A1 | 11/2006 | Easty |
| 2006/0277569 A1 | 12/2006 | Smith |
| 2007/0022459 A1 | 1/2007 | Gaebel |
| 2007/0033531 A1 | 2/2007 | Marsh |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0113243 A1 | 5/2007 | Brey |
| 2007/0217436 A1 | 9/2007 | Markley |
| 2007/0233857 A1 | 10/2007 | Cheng et al. |
| 2007/0276926 A1 | 11/2007 | LaJoie |
| 2008/0092181 A1 | 4/2008 | Britt |
| 2008/0192820 A1 | 8/2008 | Brooks |
| 2008/0229354 A1 | 9/2008 | Morris et al. |
| 2008/0271068 A1* | 10/2008 | Ou et al. ........................ 725/32 |
| 2008/0273591 A1 | 11/2008 | Brooks |

* cited by examiner

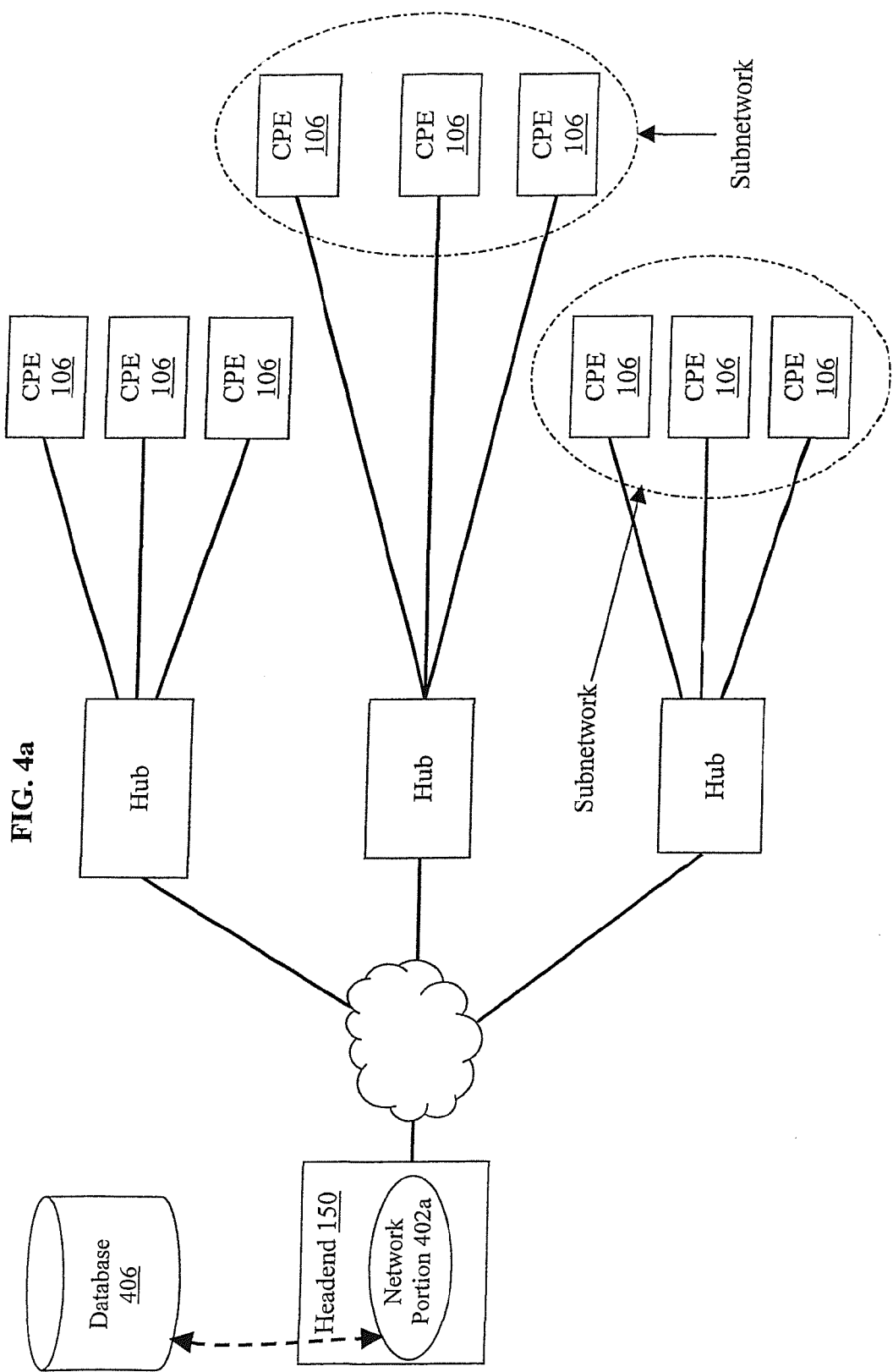

METHODS AND APPARATUS FOR REVENUE-OPTIMIZED DELIVERY OF CONTENT IN A NETWORK

PRIORITY AND RELATED APPLICATIONS

This application is a continuation of and claims priority to co-owned and co-pending U.S. patent application Ser. No. 11/974,700 of the same title filed Oct. 15, 2007, issuing as U.S. Pat. No. 8,099,757 on Jan. 17, 2012, which is incorporated herein by reference in its entirety. The present application is also related to U.S. patent application Ser. No. 12/284,757, entitled "METHODS AND APPARATUS FOR USER-BASED TARGETED CONTENT DELIVERY" filed on Sep. 24, 2008, which is now published as U.S. Patent Application Publication No. 2009/0187939 and claims priority to U.S. Provisional Patent Application Ser. No. 60/995,655 filed on Sep. 26, 2007 and having the same title, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of multimedia delivery networks, and specifically in one aspect to using available bandwidth on the network in order to provide both optimized revenue and delivery of video services over a content-based network such as a cable television network.

2. Description of Related Technology

One significant competitive challenge presently faced by network operators relates to managing and conserving bandwidth. This includes the reclamation of otherwise under-utilized or unused bandwidth such that the service and/or customer base can be expanded without significant modifications or build-outs of the underlying network infrastructure. For example, it is desirable to expand the types and availability of "next-generation" network services, including high-definition (HD) broadcast, VoD, high-speed data, VoIP, Interactive TV, etc. over time, without the need for major capital expenditures or system modifications. Hence, network operators are increasingly focused on techniques for "squeezing" as much capacity out of their existing networks as possible.

In a conventional cable network, bandwidth planning and usage tends to be relatively static over time. A network operator periodically changes the channel line-up to delete channels, add new channels and services or change the relationship between logical channel map and frequency domain location of the channels. Channel line-up changes are performed typically few times a year to meet the engineering and business needs and resource available in the network. Thus, channels available in the network stay relatively static when compared to the frequency with which subscribers tune in and out of various program channels. Additionally, when a specific channel lineup is put in place, the network bandwidth utilization remains fairly static, regardless of how many subscribers are viewing which programs at any given time.

Broadcast Switched Architecture (BSA) cable television networks such as that described in co-assigned application Ser. No. 09/956,688, entitled "Technique for Effectively Providing Program Material in a Cable Television System", incorporated herein by reference in its entirety, deliver only a subset of available programming to network subscribers in order to optimize bandwidth. Delivery of programming is typically based on customer requests for programming; however, bandwidth consumption may vary greatly during the day. In a fixed bandwidth model, the BSA architecture delivers a fixed amount of programming based on the fixed bandwidth constraint; the programming actually delivered at any given time will be only a fraction of the total of the programming available to the user base.

Based on such constraints, the foregoing need for bandwidth optimization and reclamation associated with a traditional network architecture is also applicable to switched network architectures. Since switches within the network are used to selectively provide only those channels actually watched or requested by users to their hubs or nodes for delivery, this allows for the deletion of unwatched channels from the digital broadcast stream. A "deleted" channel is automatically switched back on when a subscriber subsequently selects it, with the switching and delivery transition being for all intents and purposes transparent to the subscriber. This approach has obvious benefits from the standpoint of bandwidth conservation.

The need for bandwidth conservation and the choice of multiple services a network operator can provide to the subscribers (e.g., broadcast, VoD, PVR/DVR, DOCSIS, VoIP, etc.) gives rise to new opportunities in terms of how to use incremental available bandwidth so as to best maximize the operator's revenue or profit. This is particularly true in the BSA context. One such source of revenue or profit is third party advertising. Accordingly, the type and distribution of such advertising is a very significant determinant of network operator revenue/profits.

In conventional cable networks, advertisement revenues depend largely on the footprint of the network and the number of subscribers. As described below, advertisements or similar promotional content may be inserted at the national level, or locally (e.g., by the network operator). The revenues generated are determined in large part based on the program stream into which the advertisements are inserted, and the time of delivery (e.g., prime-time). Advertisers may know for example that a target demographic, such as 18-30 year-old females, has a very high viewership for a certain program at a certain time. Hence, their advertisement will likely obtain a high number of "looks" or impressions, and accordingly their likely benefits in terms of such 18-30 year-old females buying their products will be higher. Accordingly, the price that can be charged for such advertising placement is accordingly high. This system may be indexed for example to third party indicia such as the well-known Nielsen Ratings.

However, in the BSA architecture, more control over "who sees what" in terms of advertisement is possible, and revenue may be tied to a per-viewing model, where revenue is collected based how many subscribers requested and viewed a particular program or advertisement, as well as the demographic profile of the subscriber requesting the program.

A variety of different approaches to bandwidth optimization in light of revenue or profit considerations are known in the prior art. For example, U.S. Pat. No. 7,143,431 to Eager, et al, issued Nov. 28, 2006 entitled "Method for reduced bandwidth for on-demand data streaming using mini-clusters" discloses an improvement on dynamic skyscraper delivery of continuous media programs, such as video, divides the channels used for the delivery of the video into leading and trailing groups. A cluster defining on transmission of a program can then be broken into mini-clusters in the leading group which may be freely matched to full clusters in the lower group with loosened alignment requirements. This decoupling provides more efficient allocation of bandwidth to on-demand consumer requests and permits strategic opportunities to merge requests with concurrently allocated bandwidth for similar programs.

U.S. Pat. No. 7,075,945 to Arsenault, et al, issued Jul. 11, 2006 entitled "Dynamic mapping of broadcast resources" discloses a method wherein in a data communication system such as a high capacity DBS system, dynamic mapping of broadcast resources is provided to exploit occasional redundancy in the program content of two or more input data streams, freeing at least one broadcast resource to carry alternate bitstreams, such as additional programs or existing programs at higher quality. Transmission maps defining the correspondence between input data streams and broadcast resources, and reception maps defining the correspondence between broadcast resources and output data streams, are updated as needed to dynamically modify broadcast resource mapping to increase effective utilization of available bandwidth. Beneficial n:n-y:m mapping in a high capacity consumer DBS entertainment system is provided. Apparatus and methods for generating, maintaining and updating allocation maps with reduced overhead requirements, are disclosed.

U.S. Patent Application Publication No. 20020087976 to Kaplan, et al. published Jul. 4, 2002 entitled "System and method for distributing video with targeted advertising using switched communication networks" discloses a system and method for delivering broadcast-quality video with targeted advertising to viewers over the switched communication network. According to one embodiment, program streams with appropriately inserted splice points are transmitted from a network headend node to one or more egress nodes via a switched network. Because the switched network only carries program streams while advertising is inserted at the edges of the network, programs with demographically-targeted advertising can be delivered to many different subscribers without the need for using the bandwidth of the switched network to carry a unique program and advertising stream for each demographic group from the head end node.

One significant issue or disability with the foregoing methods relates to their lack of ability to combine availability of network resources with the profile of subscribers requesting programs. The aforementioned prior art performs optimization on one aspect or the other of available network bandwidth or other network resources, without taking into account the totality of considerations needed to optimize revenues for the network operator.

Another significant issue with prior art approaches to bandwidth optimization in content-based networks (including the aforementioned broadcast switched architectures) relates to the requirement for manual intervention or input on the part of the network operator (e.g., MSO) in order to make best use of the available bandwidth. Specifically, many such systems require periodic operator adjustment or input in the form of re-arranged channel line-up, which may also include the requirement for periodic evaluation of the subscriber's viewing or tuning habits, and the generation of adjustments to be inserted into the system control functions based thereon. One disability with this approach is the need for constant (or near-constant) operator vigilance. Another disability is latency; the operator is basically always lagging the problem since changes in subscriber habits can occur rapidly, and the efficacy of any corrections made by the operator will in large part depend on the timeliness with which the operator performs his/her analysis and corrective action/adjustment. Greater operator vigilance is also required when the system is approaching the limits of its capacity, since excursions in demand or changes in viewer habits can easily cause an over-demand condition (potentially resulting in a loss of service to one or more subscribers for a period of time).

Hence, based on the foregoing, there is a distinct need for improved apparatus and methods that permit optimization of costs and benefits to the network operator of fulfilling a program viewing request made by a subscriber on a request-by-request (i.e., per CPE) basis, and effectively in real time. Ideally, such apparatus and methods would allow for the selection, from among multiple revenue generation/service options, the option (or collection of related options) most optimal at a given time.

Moreover, such improved apparatus and methods would allow for optimization of network resources such as bandwidth based on the requesting subscriber's demographic or other particular profile. Efficient use of "targeted" advertising would also be available, that would also maintain high signal quality through delivery to the subscriber.

Such improved apparatus and methods would also preferably work with a set of rules defined by a network operator, without undue manual intervention, or continuous vigilance by the network operator.

SUMMARY OF THE INVENTION

The present invention satisfies the foregoing needs by providing improved apparatus and methods for fulfilling program viewing requests, such as for example by evaluating multiple options of doing so, and by picking the option that best optimizes network operator's cost criteria, such as may be used in a cable, DSL or satellite network.

In a first aspect of the invention, a method of operating a content distribution network is disclosed. In one embodiment, the network has a plurality of consumer premises equipment (CPE) associated therewith, and the method comprises: receiving a request for program delivery from a CPE of the network; evaluating at least two possible delivery options for servicing the request, the evaluating being performed based on at least one operational consideration and at least one business consideration relating to the network; and based at least in part on the act of evaluating, performing one of the delivery options in order to service the request.

In one variant, the at least two options comprise: (i) creating a new program stream, and causing the CPE to tune thereto; or (ii) causing the CPE to tune to a pre-existing program stream. The at least one operational consideration comprises e.g., bandwidth, and the at least one business consideration comprises revenue or profit.

In another variant, the evaluating based on at least the bandwidth and the revenue or profit comprises performing a cost analysis for each of the options, and selecting the option with the optimal cost.

In still another variant, the evaluating based on at least one business consideration comprises evaluating based on at least one demographic or psychographic factor associated with a subscriber of the requesting CPE.

In yet a further variant, the evaluating based on at least one business consideration comprises evaluating the correlation of at least one demographic associated with a subscriber of the requesting CPE with advertising content carried on the pre-existing stream.

In still another variant the performing one of the delivery options in order to service the request comprises performing creating a new program stream, and causing the CPE to tune thereto, the new stream containing spliced-in advertising content, the advertising content being selected based at least in part on demographic data associated with the requesting CPE.

In another embodiment, the method comprises: receiving a request for program delivery from a CPE of the network; evaluating at least two possible options for servicing the request in terms of a cost and benefit of each option; and in response to the evaluating, performing at least one of: (i) creating a new program stream, and causing the CPE to tune thereto; or (ii) switching the CPE to an existing program stream, in order to service the request.

In one variant, the network comprises a broadcast switched architecture network, and the evaluating is performed by a software entity disposed at least partly at a switching hub of the network. The creation of a new program stream comprises creating a stream having content at least partly determined based on a demographic associated with a user of the requesting CPE.

In another variant, creating a new program stream comprises creating a stream having content at least partly determined based on a demographic associated with a user of the requesting CPE.

In another embodiment, the method comprises: delivering at least first and second program streams to a plurality of users, the content of the first and second streams each being at least in part tailored to one or more respective demographic variables; identifying at least one projected bandwidth deficiency on the network; and selectively switching ones of the plurality of users from the first program stream to the second program stream, or from the second program stream to the first program stream, based at least in part on the projected deficiency and a relationship between the respective demographic variables.

In one variant, selectively switching comprises switching enough ones of the plurality of users to substantially mitigate the deficiency.

In another variant, the act of identifying comprises: determining a projected available bandwidth some time in the future; determining a projected demand for the program; and determining the deficiency based at least on the projected available bandwidth and the projected demand. Also, at least one of the projected available bandwidth and the projected demand may be based on historical data for a network.

In still a further variant, selectively switching comprises consolidating a plurality of users of the network onto one of the first or second streams so as to permit removal of the other of the first and second streams from delivery.

In yet other variants, the relationship between the respective demographic variables comprises a match between at least some of the variables, or a graded correlation between at least some of the variables.

In a second aspect of the invention, a method of managing bandwidth within a content distribution network is disclosed. In one embodiment, the network has a plurality of consumer premises equipment (CPE) and respective users associated therewith, and the method comprises: establishing a plurality of at least partly different program streams for at least some of respective ones of the CPE and users; identifying at least one bandwidth constraint on the network; and migrating at least one of the CPE to a program stream different than that to which it is presently tuned; and selectively removing one or more of the program streams from being delivered over the network. The migration is based at least in part on demographics associated with a user of the at least one CPE.

In one variant, establishing a plurality of at least partly different program streams comprises creating a streams having content at least partly determined based on a demographic associated with a user of a requesting CPE.

In another variant, the act of migrating based at least in part on demographics associated with user of the at least one CPE comprises: identifying at least one of the existing program streams that shares a common demographic with the demographics of the user of the at least one CPE; and migrating the at least one CPE to the identified existing program stream.

In yet another variant, the act of identifying at least one bandwidth constraint comprises identifying the at least one constraint based on analysis of a predicted value of bandwidth consumption based at least in part on historical data.

In a third aspect of the invention, a software architecture for use in a content based distribution network is disclosed. In one embodiment, the network has a node and a plurality of consumer premises devices in operative communication with the node, and the architecture comprises: a first process in communication with the node; a plurality of second processes operative to run on respective ones of the devices and communicate with the first process. The first process is adapted to receive information from the second processes and evaluate individual program delivery requests from the devices and determine one of a plurality of delivery options which will best satisfy each the request, the determination being based at least in part on the information obtained from the device associated with the each request.

In one variant, the network comprises a broadcast switched architecture (BSA) network, and the information is selected from the group consisting of: (i) demographic information of a user of the consumer premises device; (ii) configuration or capabilities information of the consumer premises device; and (iii) historical tuning activity information for the device.

In another variant, the network comprises a broadcast switched architecture (BSA) network, and the information comprises demographic information relating to the user associated with the device, and the evaluation comprises analyzing the demographic information in relation to the content of one or more existing program streams to determine the degree to which the demographic information correlates with the content.

In a fourth aspect of the invention, apparatus for use in a content distribution network is disclosed. In one embodiment, the network delivers programming specifically configured for certain viewer demographics, and the apparatus comprises: a processor; an interface in data communication with the processor, the interface adapted to communicate with a storage device; a network interface; and at least one computer program adapted to run on the processor. The at least one program is in one variant configured to: determine one or more demographics associated with at least one subscriber of the network that is requesting a program; and perform an analysis between two or more possible options for servicing the program request, the analysis being based at least in part on the demographics; and select one of the options for delivery based at least in part on the analysis.

In one variant, the apparatus is further adapted to cause a premises device of the requesting subscriber to tune to a QAM corresponding with the selected delivery option.

In another variant, the selected delivery option comprises use of an existing program stream to satisfy the request.

In yet a further variant, the apparatus comprises a control apparatus used in a broadcast switched architecture (BSA) network switching hub.

In still another variant, the analysis based at least in part on the demographics comprises performing a revenue-based analysis of the options, the options each having an at least partly different demographic profile, the at least partly different demographic profiles resulting in different revenues.

In a fifth aspect of the invention, a method of operating a content distribution network having a plurality of CPE operating thereon is disclosed. In one embodiment, the CPE each receive at least a respective one of a plurality of program streams being delivered over the network, and the method comprises consolidating at least some of the CPE onto a fewer number of the program streams in order to allow subsequent removal of one or more of the program streams within the network. The consolidating comprises performing an analysis of at least a portion of the streams, the removal of the one or more streams being based at least in part on the analysis.

In one variant, the analysis comprises a cost-benefit analysis.

In another variant, the network comprises a broadcast switched architecture (BSA) network, and the analysis is performed at least party by a software process operative to control a switch within the BSA network.

In yet another variant, the analysis comprises a demographic analysis of the relevant ones of the CPE currently tuned to a given one of the program streams, relative to another of the streams. The demographic analysis assigns a score determined based at least in part on the correlation of one or more demographics of a subscriber associated with one of the relevant CPE to one or more demographics to the another of the streams.

In still a further variant, the method further comprises determining that a bandwidth constraint exists or will exist in the future on the network, and the consolidating is based at least in part on the bandwidth constraint.

In another embodiment, the method comprises: determining that a bandwidth constraint exists or will exist in the future on the network; and consolidating at least some of the CPE onto a fewer number of the program streams in order to allow subsequent removal of one or more of the program streams within the network. The consolidating comprises determining the correlation between one or more demographics of subscribers associated with the at least some CPE to those characterizing the one or more program streams being removed, the removal of the one or more streams being based at least in part on the correlation.

In a sixth aspect of the invention, a computer readable apparatus is disclosed. In one embodiment, the apparatus comprises a storage medium adapted to store a computer program, and the program is adapted for use in a content distribution network.

In a seventh aspect of the invention, methods of doing business based on, inter alia, dynamic cost-benefit analysis of service options are disclosed.

In an eighth aspect of the invention, a network is disclosed. In one embodiment, the network is adapted to perform dynamic cost-benefit analysis for servicing subscriber requests.

In a ninth aspect of the invention, a network architecture having a substantially centralized content insertion splicer is disclosed. In one embodiment, the architecture comprises an advertising splicer located coincident with a network server (e.g., VoD server) that provides a more efficient network architecture in terms of reduced stream acquisition costs.

In a tenth aspect, a server apparatus for use in a content distribution network is disclosed. In one embodiment, the server apparatus comprises: a first network interface in data communication with the network for establishing plurality of user sessions; and a second interface in data communication with an advertising or promotional content source. The apparatus is adapted both establish a plurality of content delivery session, and insert or splice advertising or promotional content within program content delivered via the sessions, within the network.

In one variant, the network comprises a cable television network, and the server apparatus comprises a video on demand (VoD) server disposed as a headend of the cable network.

BRIEF DESCRIPTION OF THE DRAWINGS

FIG. 4A is a block diagram illustrating a first exemplary embodiment of a network software architecture according to the present invention.

DETAILED DESCRIPTION OF THE INVENTION

Figure 1:
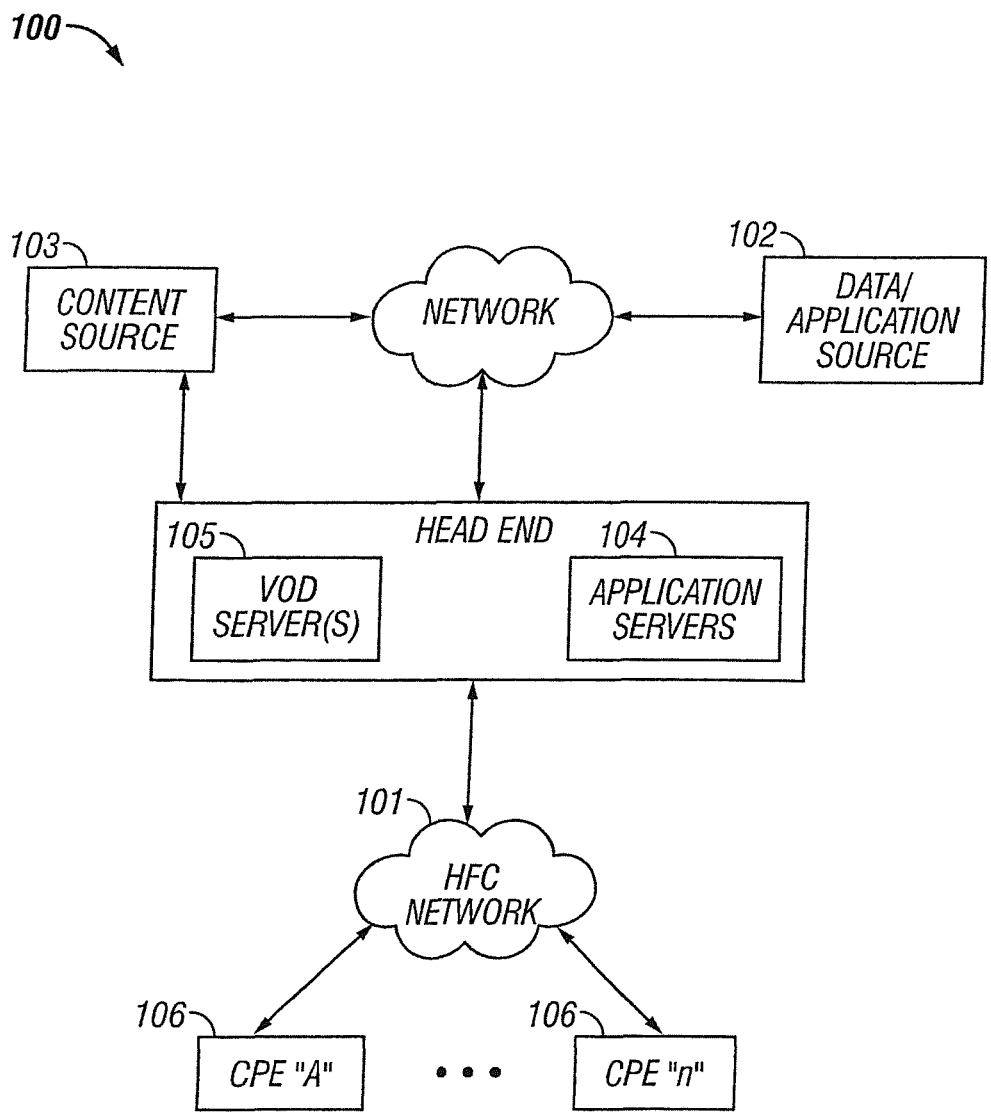
FIG. 1 is a functional block diagram illustrating an exemplary HFC cable network configuration useful with the present invention.

Reference is now made to the drawings wherein like numerals refer to like parts throughout.

As used herein, the term "advertisement" and similar forms refers without limitation to any audio, visual, or other promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example: an iPod™, Motorola ROKR, or smartphone.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" security module access technology, a downloadable CA system (DCAS), or otherwise.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for interne access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANS, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for the "intelligent" optimization of content-based network operation based on, e.g., cost and/or revenue implications.

When a consumer premises device attached to the network tunes to a particular program, it uses at least some network resources, but also may create the potential for revenue gain to the network operator. For example, each device asking for a unicast program delivery will use additional bandwidth on the network. When the device tunes to a specific program, it may have one or more specific revenue implications to the operator. A device may, for instance, be associated with a subscriber that the operator has identified as a target customer for personal advertisement. When the device requests a program viewing, this may directly or indirectly boost the network operator's advertisement revenues. The more positively "correlated" the subscriber is to a target demographic or advertisement, the greater the ultimate revenue potential.

In general, a network operator desires to maximize positively correlated assets, and minimize negatively correlated assets. The operator may wish to optimize its network operation such that e.g., benefits are maximized and burdens or costs are minimized through use of a weighted function of these benefits and costs.

In an exemplary embodiment of the invention, the above-described optimization can advantageously be performed in a substantially automated fashion by applying a set of rules via a software process (Network Optimization Controller, or NOC). The NOC evaluates the various costs and benefits associated with various options for servicing a subscriber content delivery request, and selects the most optimal option based on network operator rules that are programmed into the NOC. For example, the NOC may decide between instantiating a new program stream that is specifically delivered and/or targeted to a limited number of subscribers, herein referred to as a "microcast" (and accordingly consuming additional bandwidth), versus steering the new request to an existing program stream that has a suitable correlation to the requesting subscriber's demographics or psychographics (and perhaps utilizing the additional bandwidth for other purposes, such as a VoD session, which may represent a better revenue opportunity).

Additionally, one aspect of the invention also provides a mechanism for the consolidation or recombination of subscriber devices in the case of a resource-constrained (e.g., bandwidth contentious) environment. This mechanism allows for the intelligent migration of subscribers to a fewer number of less-pointedly targeted streams (yet that still bear a maximal correlation with their demographics/psychographies), thereby reducing the bandwidth consumption on the network.

The methods and apparatus of the present invention open up new opportunities for network operators in terms of profitability by providing, inter alia, cost/benefit analysis on a request-by-request basis. This enhanced level of granularity in network control allows the network operator to maintain and dynamically adjust network profitability on an ongoing basis, and/or evaluate and control network operation in light of both operational considerations (e.g., bandwidth allocation, reliability, continuity of service, etc.) and business considerations (e.g., revenue, profit, customer satisfaction and subscription/renewal levels, etc.).

Additionally, because embodiments of the invention monitor program requests and viewer profiles (and demographics), it allows for relatively precise impression counts to be used as feedback into the NOC engine, as well as improved advertisement billing and reporting. For example, the NOC knows at any given time how many subscribers are tuned to a particular program in the network, and their demographic/psychographic profiles and locations.

The foregoing techniques can also advantageously be implemented in a predictive or "look-ahead" fashion, both in terms of what a given subscriber (or group of subscribers) may request in terms of programming, as well as future projected bandwidth demands and constraints (e.g., as a function of time of day, day of the year, and so forth).

In another aspect of the invention, real-time acquisition (RTA) costs are advantageously reduced through leveraging of the "microcast" concept; i.e., combination of an advertising "splicer" and a network device such as a server (e.g., a VoD server). Under prior art approaches, a plurality of separate acquisition costs (e.g., N×the number of zoned streams acquired) are incurred by virtue of the network configuration and the fact that the splicer is separated from the server. However, under one exemplary approach described herein, the splicer is relocated to a VOD or other content server, thereby requiring the acquisition of only one stream. Zoned content need not be captured. This stems primarily from the fact that the now "micro-zoned" output is constructed at time of program stream configuration. Basically using the VOD server as a splicer/stream generator for multicast feeds helps make an economical hardware model for the implementation of BSA microcasting.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is Rather noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Bearer Network Architecture—

FIG. 1 illustrates a typical content-based network configuration with which the optimization apparatus and methods of the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
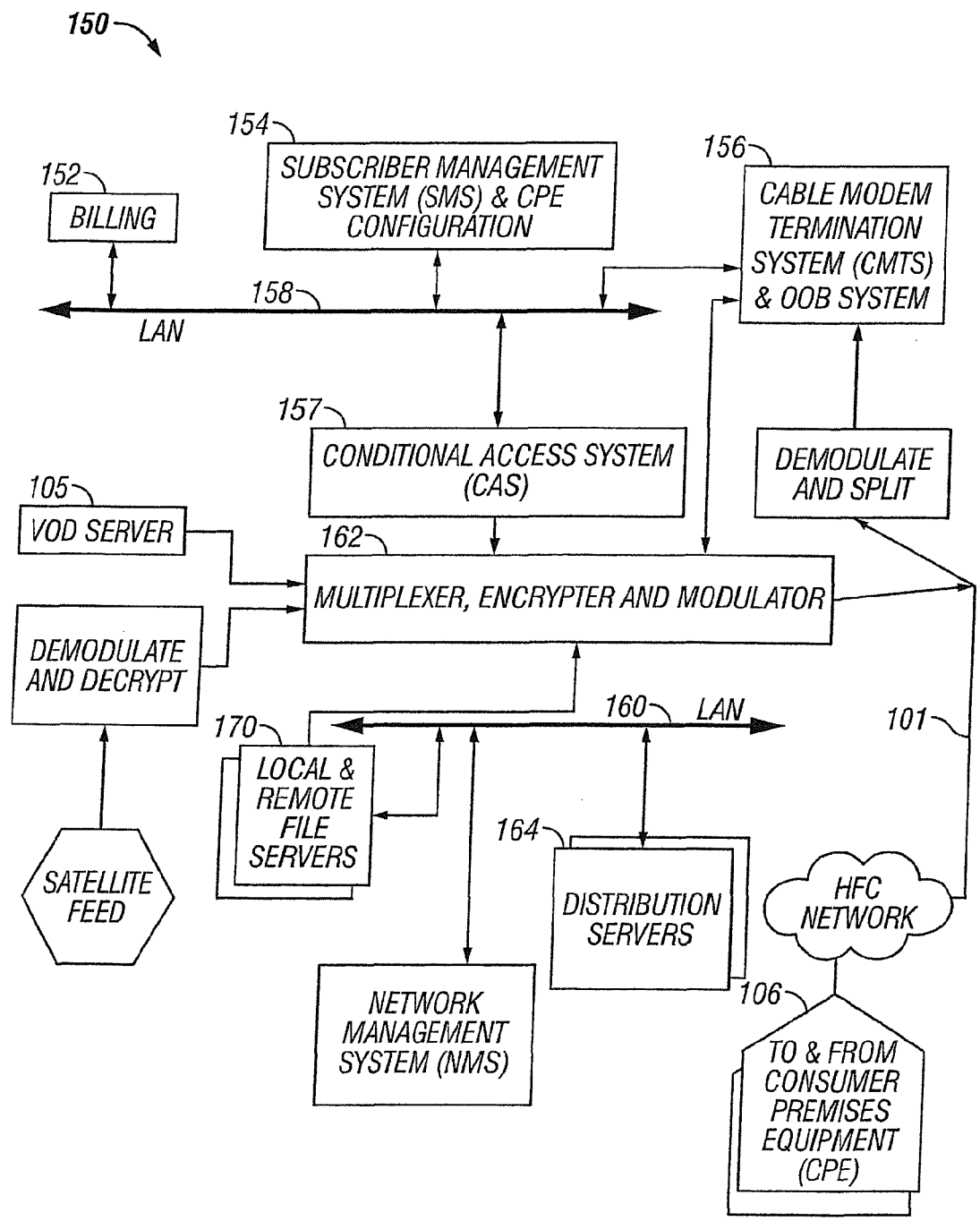
FIG. 1A is a functional block diagram illustrating one exemplary HFC cable network headend configuration useful with the present invention.
Figure 1B:
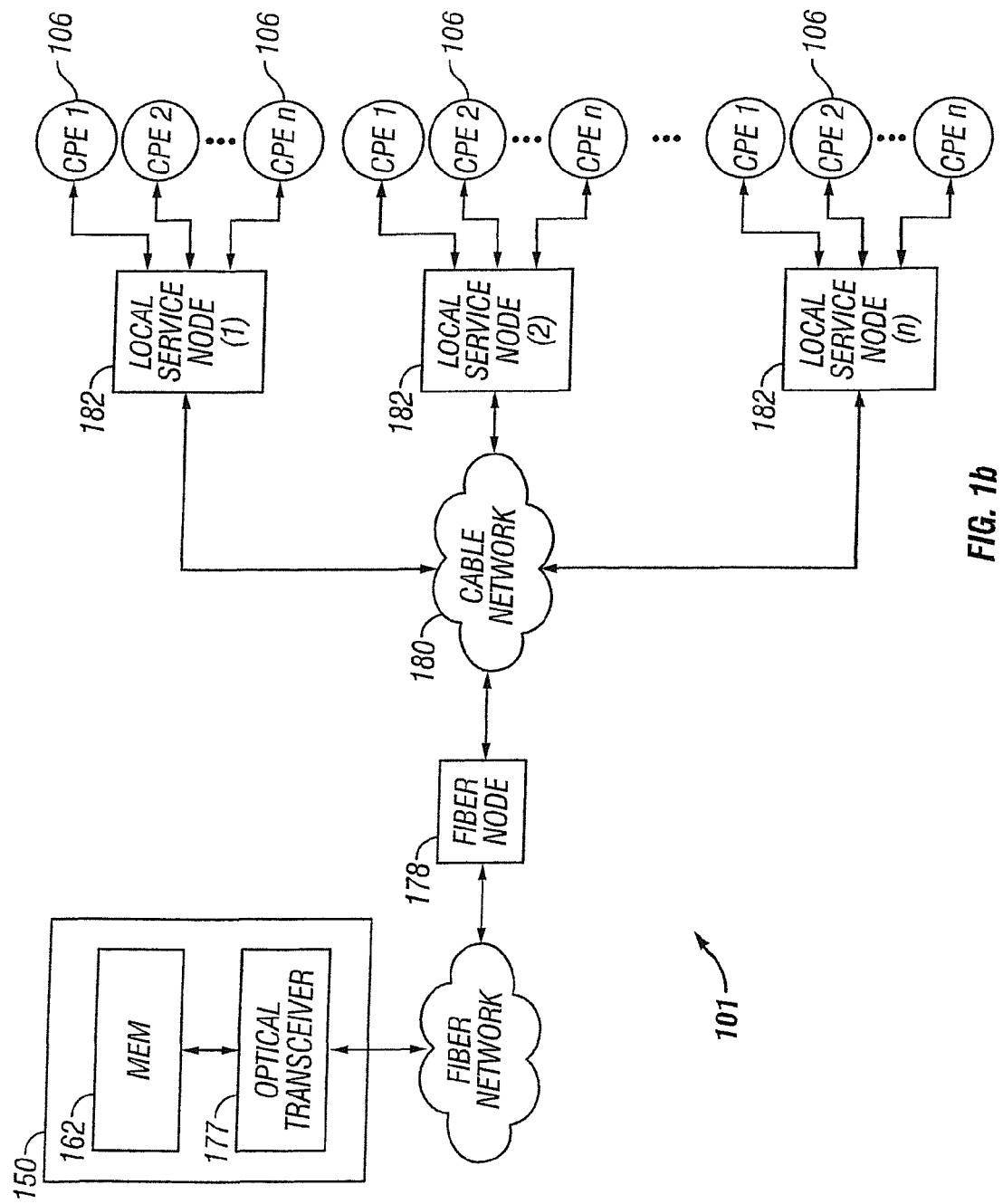
FIG. 1B is a functional block diagram illustrating one exemplary local service node configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The exemplary architecture 150 of FIG. 1a further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs via a variety of interposed network components.

Figure 1C:
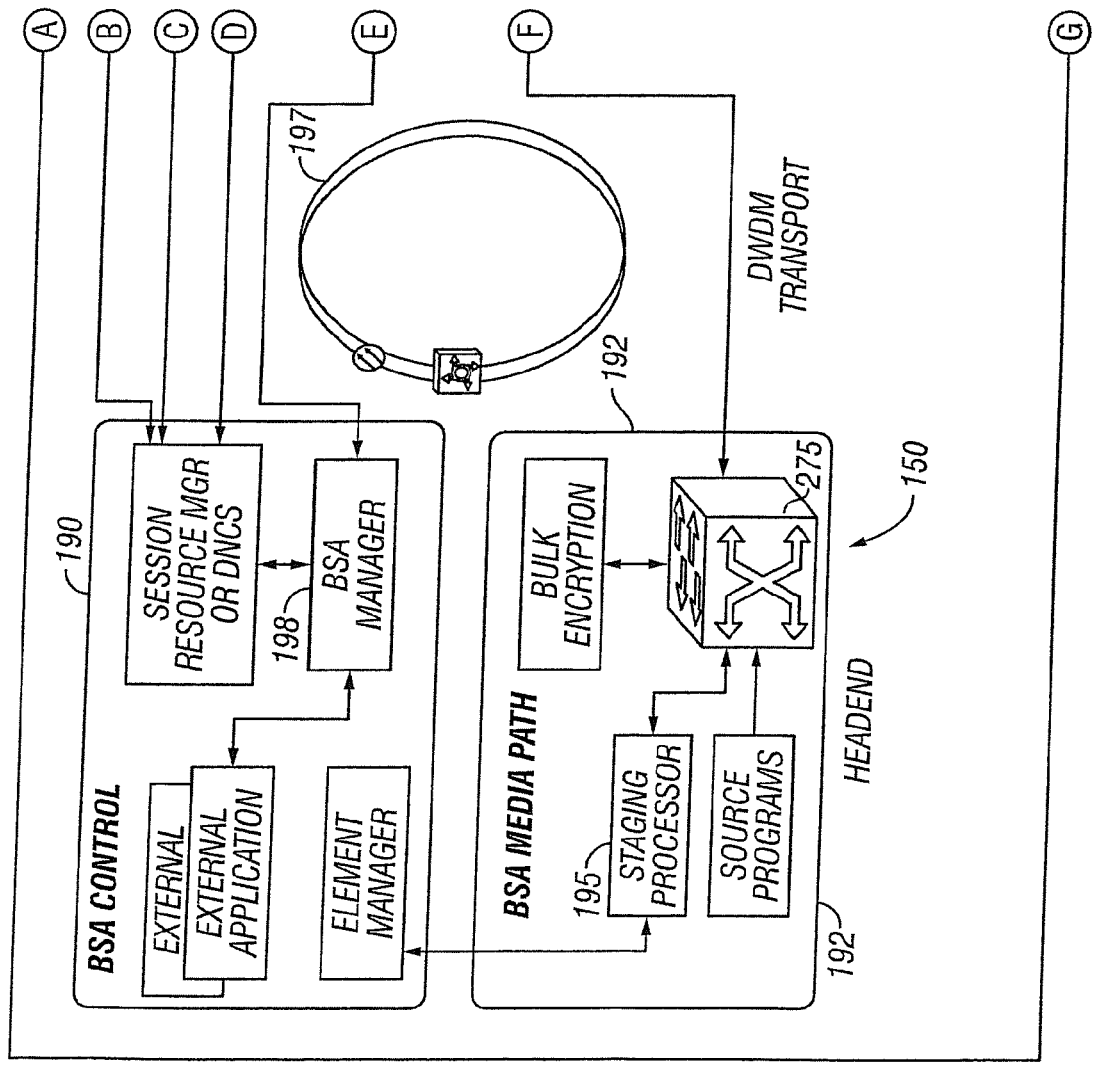
FIG. 1C is a functional block diagram illustrating one exemplary broadcast switched architecture (BSA) network useful with the present invention.
Figure 1C:
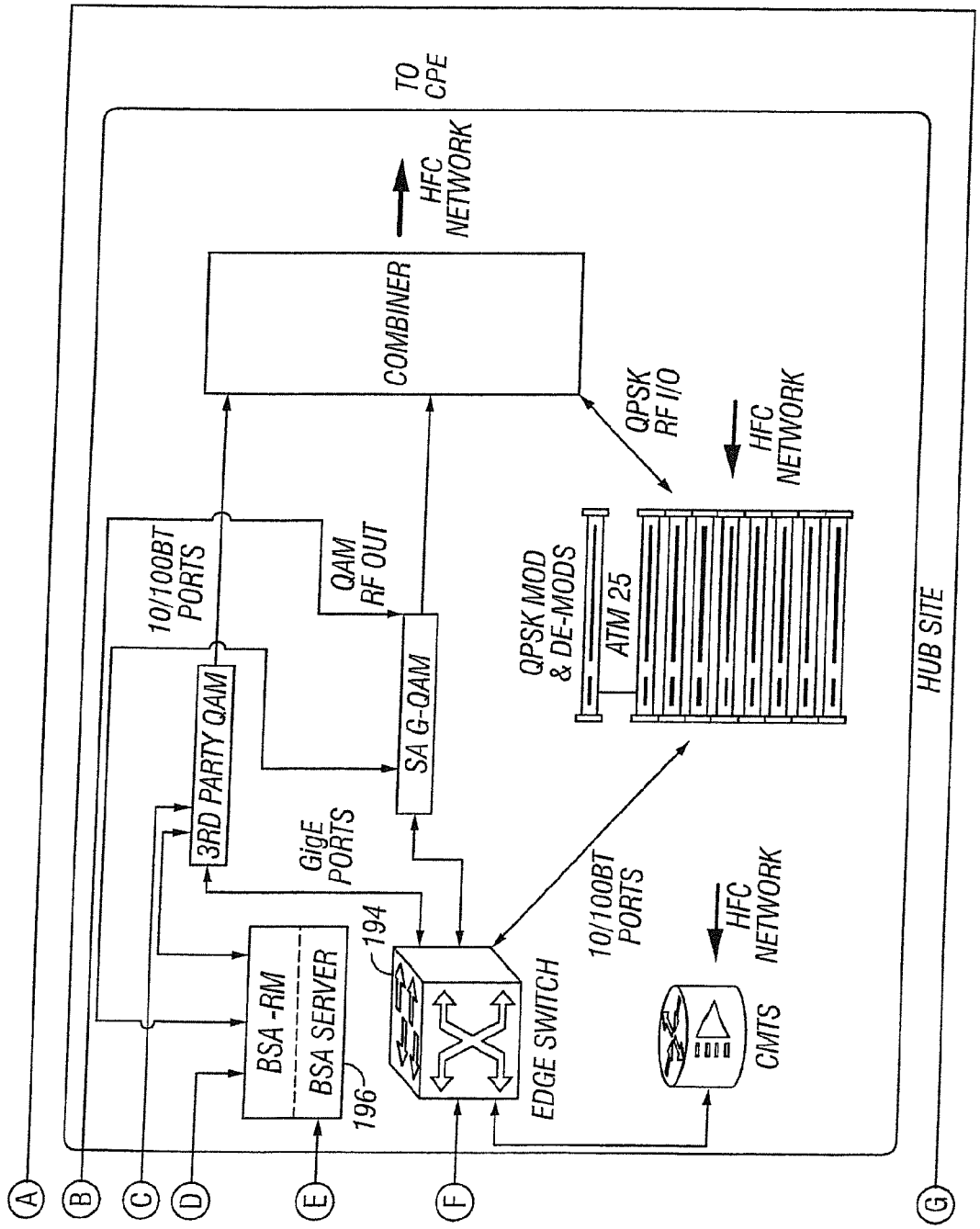

It will also be recognized, however, that the multiplexing operation(s) need not necessarily occur at the head-end 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1c illustrates an exemplary "switched" network architecture also useful with the cost/revenue optimization and allocation features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VOD) systems, BSA programs are streamed to a service group (contrast: switch) only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler that VoD. Commercials or other programming segments cannot be skipped, and program bitrates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bitrates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VoD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1*c*) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1*a* and 1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

General Principles of Optimization—

Figure 2A:
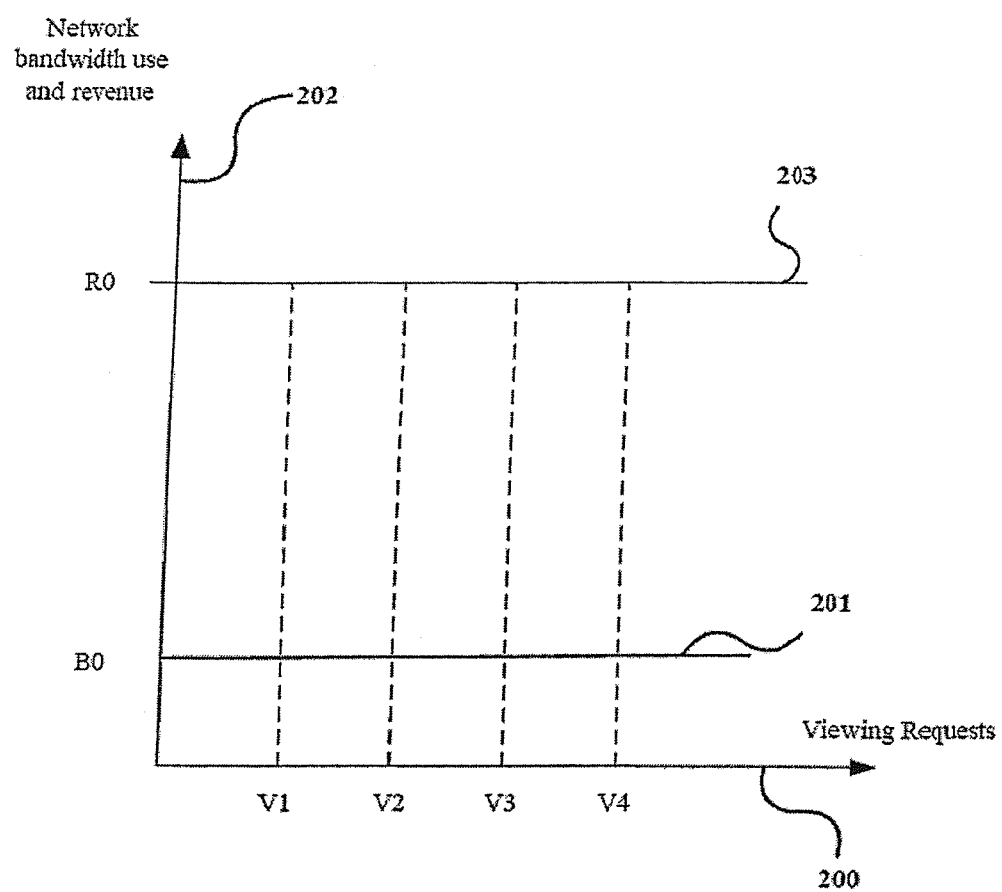
FIG. 2A is an X-Y graph showing typical cost and revenue curves in a conventional prior art content delivery network.
Figure 2B:
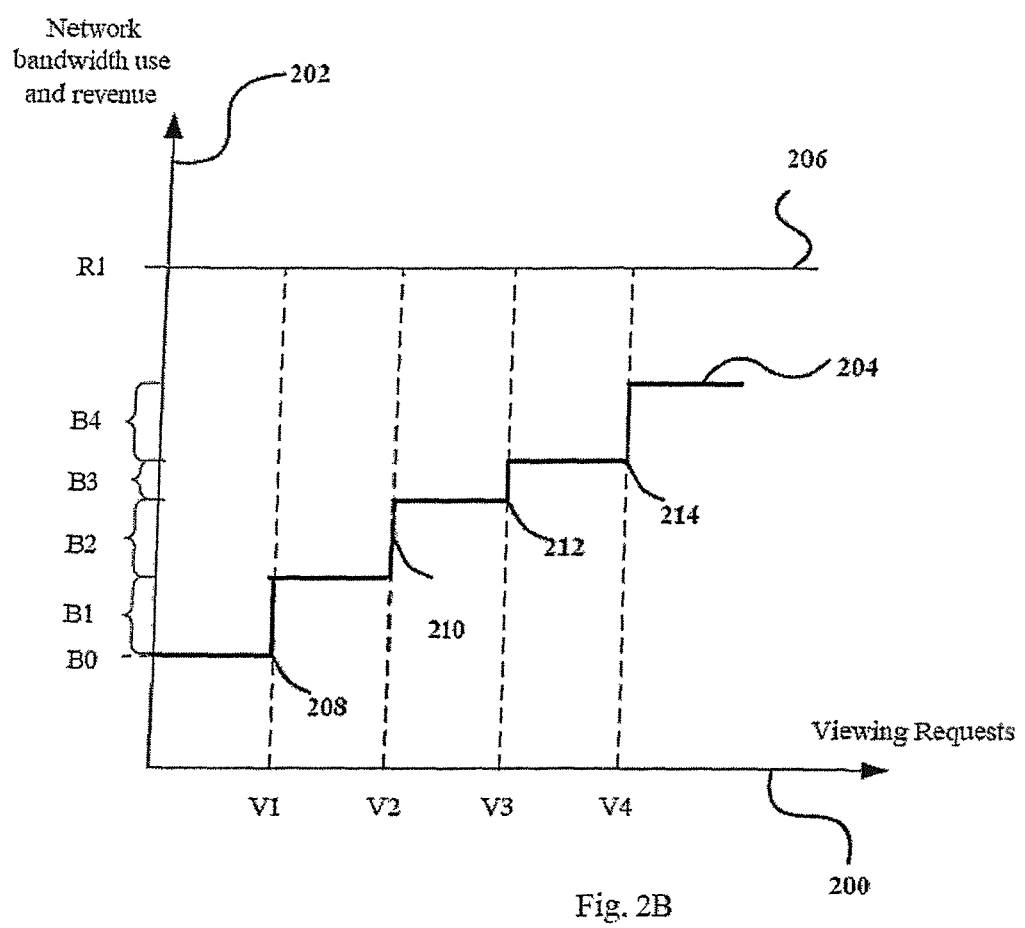
FIG. 2B is an X-Y graph showing an example of bandwidth use and revenue in an exemplary broadcast switched architecture (BSA) network according to the present invention.
Figure 2C:
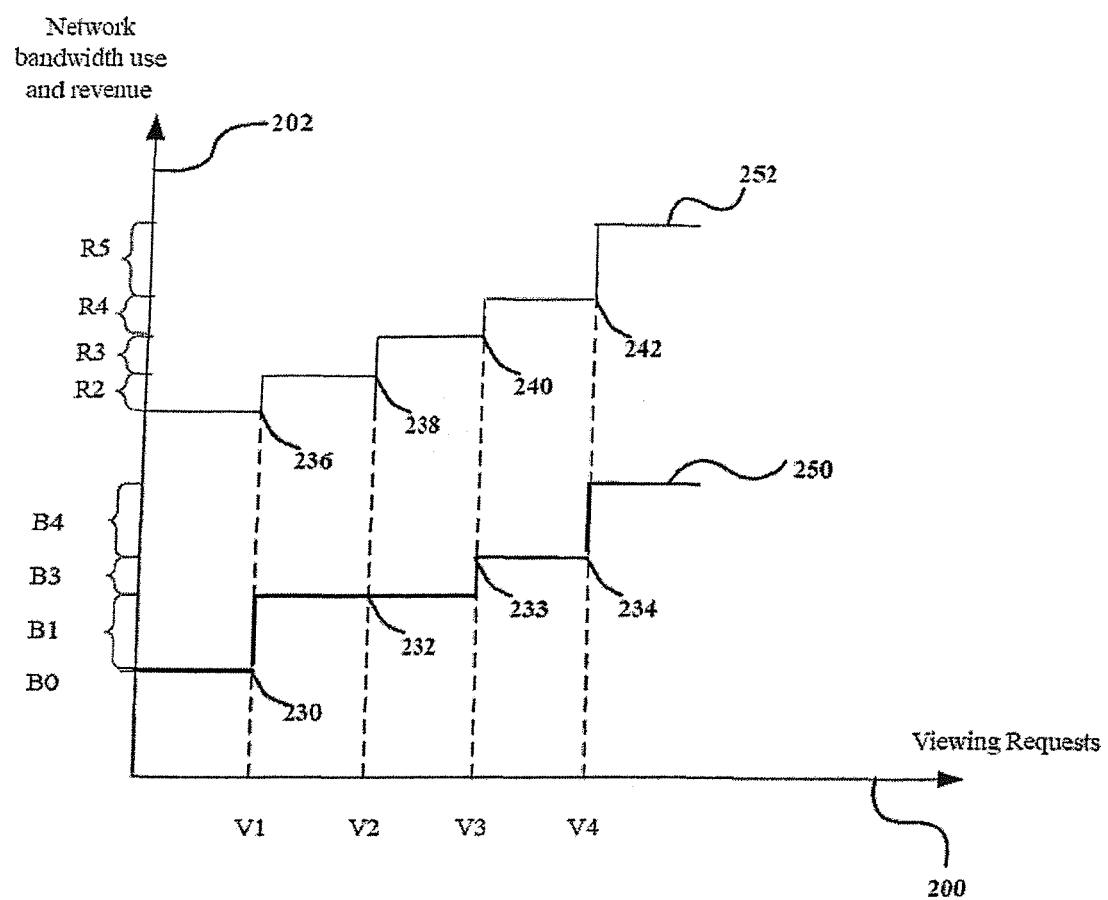
FIG. 2C is an X-Y graph showing an exemplary embodiment of fulfilling viewing requests in accordance with the present invention, wherein both the network bandwidth use and the revenue are affected by the viewing requests.

Referring now to FIGS. 2A, 2B and 2C, the general cost/revenue optimization principles of the present invention are described in greater detail. As will be described in greater detail below, these principles advantageously leverage the operational capabilities and dynamics of the BSA network paradigm so as to provide the network operator enhanced flexibility in allocating program streams and bandwidth so as to achieve one or more cost or revenue goals or implement related policies.

Specifically, FIGS. 2A-2C illustrate how four (4) program viewing requests, V1 through V4, can affect network bandwidth utilization, and the network operator's revenue opportunity. The viewing requests in this example are as follows: (i) V1 is a request for a program that requires B1 bandwidth; (ii) V2 is a request for the same program requested in V1, yet requested by a different CPE; (iii) V3 is a request for a program that requires bandwidth 133; and (iv) V4 is a request for a program that requires bandwidth B4.

FIG. 2A is an X-Y graph showing typical cost and revenue curves in a conventional prior art content delivery network, such as an analog cable network. In such a network, the bandwidth utilization is determined by the channel line-up created by the network operator. Once the operator dedicates network bandwidth to carry a particular program (or channel), the bandwidth is taken up (i.e., not available for any other use), regardless of whether any subscriber is watching that program at any given moment or not. The network operator's revenue in this conventional network example may depend significantly on the total number of subscribers and program popularity ratings. However, there is no incremental opportunity for a network operator to optimize bandwidth usage or advertisement revenue based on which subscriber is requesting which program. This relationship between network bandwidth use, network revenues and program viewing details is represented in FIG. 2A as follows. The first line 203 represents network revenue, and the second line 201 shows commitment to carriage of programs on the network as a function of program viewing requests V1, V2, V3 and V4 (shown along the abscissa or X-axis 200). As illustrated, the revenue remains constant at value R0 and bandwidth utilized remains constant at B0 regardless of individual program viewing requests by viewers.

In contrast, FIG. 2B shows an example of bandwidth use and revenue in an exemplary broadcast switched architecture (BSA) network of the type previously described herein. In such a network, each viewing request from a CPE 106 is fulfilled by a network-side entity (e.g., BSA switch controller) by providing a flow of the requested program to the requesting CPE. Such a flow may be established anew, or the requesting CPE may be instructed to share an ongoing program flow by tuning to that established program channel. In this example of FIG. 2B, no revenue optimization is performed based on the viewing requests. Thus, the revenue as a function of the viewing requests is constant with value R1, as shown by the first line 206.

Also in this example, each program viewing request is fulfilled by starting a new program flow, thereby increasing the usage of network bandwidth for each program viewing request. In the illustration of FIG. 2B, the network bandwidth utilization prior to receiving any viewing request is B0. Viewing request V1 is fulfilled 208 by adding a flow that increases network bandwidth utilization by B1 on the cost curve 204. Similarly, satisfying viewing request V2 costs the network additional bandwidth B2 (as shown at point 210), viewing request V3 costs additional bandwidth 133 as shown by point 212, and viewing request V4 cost additional bandwidth B4 as shown in point 214.

FIG. 2C shows an exemplary embodiment of fulfilling the viewing requests V1 through V4 in accordance with the present invention, wherein both the network bandwidth use and the revenue are affected by the previously described viewing requests. When the viewing request V1 is received, the network bandwidth usage increases by B1 as shown by point 230 on the bandwidth utilization curve 250, so as to accommodate flow of the requested program through the network. At the same time, the revenue opportunity for the operator increases by the amount R2, as shown at point 236 on the revenue curve 252. Because the next request V2 is for the same program as V1 (but from a different CPE 106), the network is able to fulfill the next viewing request V2 without any increase in the network bandwidth utilization. This is represented by point 232 on the curve 250. However, the network revenue increases as indicated by point 238 on the revenue curve 252 due to, inter cilia, the new viewer being within the target demographic/psychographic. The remaining viewing requests V3 and V4 result in bandwidth increases B3 and B4, respectively, shown as points 233 and 234 on the graph, and corresponding revenue increases R4 and R5, shown as points 240 and 242 on the graph.

The above three examples illustrate some of the revenue or revenue optimization opportunities presented to a network operator by satisfaction of program requests from the subscribers of the network. Specifically, the network operator can deploy means of fulfilling viewing requests that takes into account the implications of each viewing request both for (i) the available network resources (e.g., network bandwidth of the example described above), and (ii) network revenue opportunities (further described subsequently herein). Such an arrangement, among other benefits, allows the operator to trade off network bandwidth against revenue opportunities. For example, in certain cases, the operator may decide to sacrifice network bandwidth and instantiate a new program stream in order to fulfill a user request for a program stream that is already flowing in the network (such as the case of viewing request V2 above) when the benefit of increased revenue potential outweighs such additional bandwidth consumption.

Such results are achieved by, in one exemplary embodiment of the invention, deploying a Network Optimization Controller (NOC) process to help analyze and fulfill viewing requests. The exemplary NOC continuously monitors network resources and revenue potentials in a manner specified by the network operator (e.g., according to a set of prescribed business and/or operational rules), and fulfills program viewing requests by performing cost analysis of various ways in which to fulfill the requests, and selecting the "most optimal" option. Further details of the exemplary NOC process, and other aspects of the present invention, are now described in detail.

Network Optimization Controller (NOC)—

The exemplary NOC of the invention comprises a logical supervisory entity (e.g., unitary or distributed software process) that implements cost/revenue optimization functions or rules as part of fulfilling program viewing requests. In various embodiments, the NOC may be implemented at a central location for the entire network (such as e.g., a regional or national level service center), one or more headends 150, or alternatively in a more locally distributed manner, such as on existing network components (e.g., the hub switching controller in a BSA network of the type shown in FIG. 1C herein).

In one exemplary embodiment, the NOC is deployed to cost/revenue-optimize a subset of the network herein referred to a "zone." In the zone for which the NOC is responsible, the network operator programs the NOC with the topology of that zone, locations of program sources within the network, a cost and/or revenue profile of each CPE 106 within the zone, and/or other operational parameters such as for example total network bandwidth available (and perhaps the allocation of such bandwidth between DOCSIS channels and 6-MHz digital television channels).

The NOC utilizes a set of MSO rules in order to implement the foregoing cost/revenue optimization on a dynamic (and very granular) basis. While the exemplary implementation of the NOC is substantially automated, parameters associated with these rules can also be manually controlled if desired, so as to provide for the ability of operator control or override based on existing network circumstances. For example, one rule may provide different weights to benefit/burdens during the prime time compared to early morning hours. Another such rule may apply different weight to a live streaming compared to streaming to the DVR function of a CPE. Exemplary manually controlled rules could include changing weight of the network from DOCSIS-based delivery to digital cable delivery, if DOCSIS bandwidth becomes unavailable due to network outage.

Methods implemented by the exemplary NOC are now described in greater detail in the context of an exemplary broadcast switched architecture (BSA) network of the type previously described, although it will be appreciated that these methods are in no way limited to such an architecture.

Methods—

Figure 3:
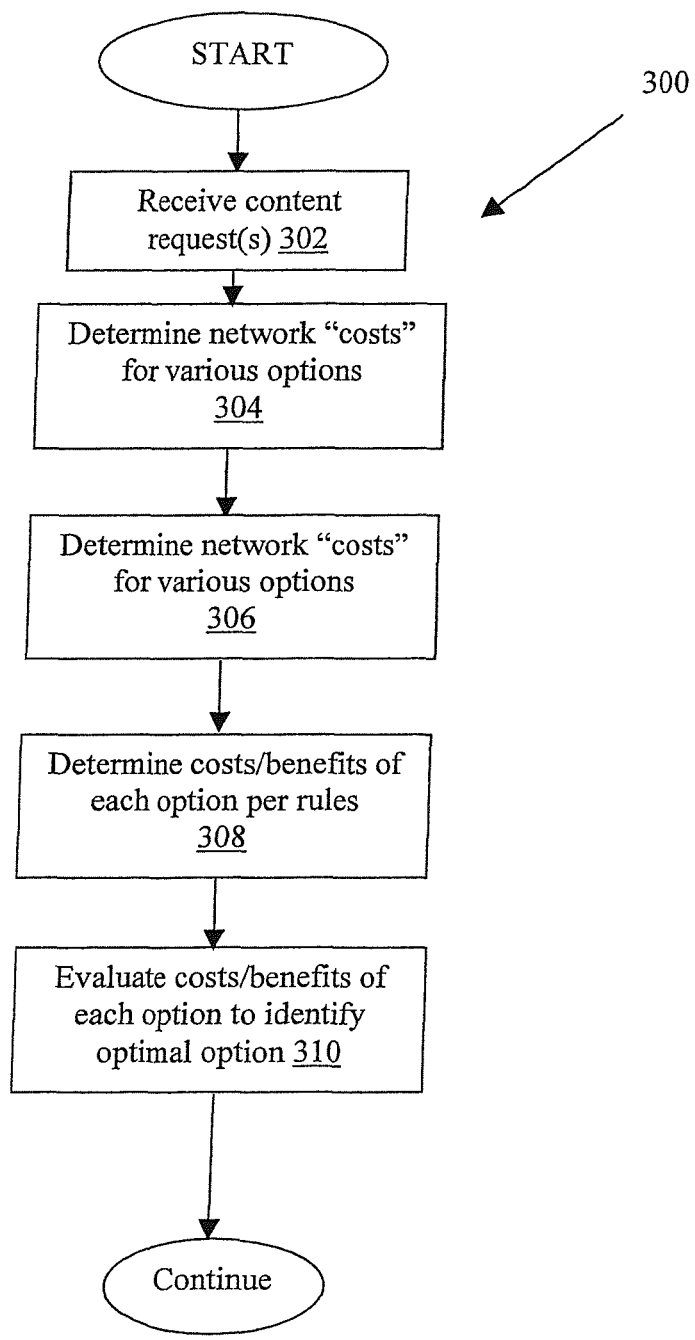
FIG. 3 is a logical flow diagram illustrating one exemplary embodiment of the generalized method of cost/benefit optimization according to the invention.

Referring now to FIG. 3, one exemplary embodiment of the generalized methodology of network cost/benefit optimization according to the invention is described. Note that the various steps shown are shown in a sequence only for ease of explanation. Actual implementations may perform intermediate steps in a different sequence, omit some steps if not included in the optimization rules of a network or perform some steps together.

As shown in FIG. 3, the method 300 comprises first receiving one or more content requests from network user(s) per step 302. It will be appreciated that while the following methodology is described in terms of a single user request, the logic embodied in this method 300 (and in fact other methods described herein) may be applied to larger groups of network users, and also may be applied in an iterative or sequential fashion (e.g., where the request associated with a first user is resolved at least in part before a request from a second user is processed, the outcome of the processing of the first user request being used as an input to the decision-making process of the second user request). Myriad other combinations and permutations of the foregoing will be appreciated by those of ordinary skill given the present disclosure.

Next, per step 304, information relating to network "costs" associated with various options for servicing content requests is gathered, as described in greater detail subsequently herein.

Per step 306, information relating to network "benefits" for servicing the content request (also described subsequently herein) is gathered.

Once the information regarding costs and benefits has been obtained per steps 304 and 306, the method 300 then evaluates this information according to one or more rules per step 308 in order to identify specific cost-benefit tradeoffs associated with various options for servicing the user service request.

Per step 310, the various cost-benefit tradeoffs of the different available options are evaluated to determine the optimal choice, and the optimal choice selected (unless overridden by a supervisory or other logical process).

Figure 3A:
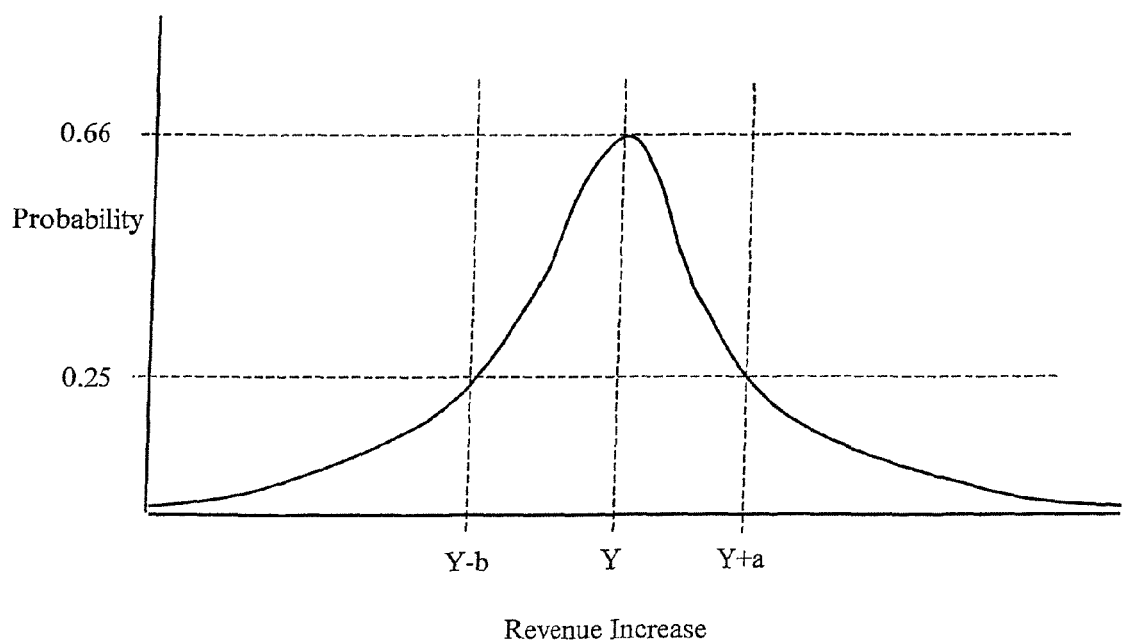
FIG. 3A is a graphical illustration of one exemplary probability distribution for revenue increase useful with the present invention.

In a simple example of the foregoing, the information obtained from step 304 may indicate that servicing the request by instantiating a new BSA program stream would "cost" the network X amount of bandwidth, and cost little if any bandwidth or other resources (assume zero) if the request was serviced by an existing stream. The information obtained per step 306 might further indicate that if a new stream is instantiated for the request, net revenue to the network has a mean or median probability of 0.66 (66% chance) of increasing revenue by Y, a 0.25 (25%) probability of increasing revenue by Y+a, and so forth (see FIG. 3A). Similarly, the net revenue effect of not instantiating the new stream, and servicing it with an existing stream would be say zero with respect to that stream, but the "saved" bandwidth could then be used to service a VoD request which has a given (assume deterministic) revenue benefit of Z. Hence, the evaluation and selection processes of steps 310 and 312 would effectively decide whether it was better to instantiate the new stream at a cost of X bandwidth in order to obtain a likelihood of increased revenue according to FIG. 3A, and ostensibly at a revenue cost of Z (due to the "lost" VoD stream). Depending for example on the relationship between Y and Z, the MSO might decide to instantiate the new stream, especially if bandwidth is not constrained at that point (i.e., the VoD stream would not be lost, since plenty of bandwidth exists to service both the new BSA stream and the VoD session). Alternatively, if bandwidth is tightly constrained, the aforementioned tradeoff between Y and Z would be more pertinent, and could be evaluated according to e.g., a prescribed algorithmic rule imposed by the MSO (e.g., if constrained and Y>Z by n percent, then instantiate new BSA stream; otherwise, do not instantiate). It will be appreciated that much more intricate algorithms may be developed and applied by the MSO, including those taking into account the aforementioned statistical distribution of revenue probability shown in FIG. 3A.

Alternatively, it will be appreciated that statistically-based or discrete models need not be used; rather, the decision logic may comprise e.g., Boolean logic, Bayesian or Dempster-Schaefer logic, fuzzy logic (e.g., variable values such as "high revenue", "medium revenue", "low revenue", etc.) of the type well known to those of ordinary skill in the mathematical and computer logic arts. Hence, the MSO can advantageously make its implementation as detailed or simplistic as it desires, and even dynamically alter the rule sets applied under different operational or business climates. For instance, a first rule set might be imposed during normal operation, and a second rule set during maintenance or equipment failure periods. Or, a first rule set could be applied during prime-time, and different rule sets during other periods. As yet another alternative, different rule sets could be applied during different holidays (or holiday season, such as the "Christmas rule set"), which are different than the normal rule sets. An almost limitless number of different rule sets and permutations are possible under the present invention.

See also the discussion provided subsequently herein ("Exemplary Optimization Rules") for examples of different rules that might be applied per the method 300 of FIG. 3.

It will also be appreciated that in a resource-contentious environment (e.g., wherein bandwidth is limited and being requested by various competing assets or processes), or to maximize the plant efficiency, a given subscriber may be tuned to an existing stream or microcast to allow for another subscriber also watching the same programming, to be targeted with a higher value microcast based on that other subscriber's demographic, psychographic, or other profile. Similarly, as more and more users are targeted with streams or microcasts, the number of such microcasts that may normally be delivered for a given network is increased. Hence, if yet a further subscriber tunes to a different program not currently being delivered, and bandwidth is in contention, then bandwidth may be freed-up (released) by consolidating microcasts into a larger microcast (macrocast) to make delivery of the requested but undelivered program possible, thereby maximizing plant bandwidth. This approach helps mitigate the adverse effect of creating multiple different "spliced" versions of content that could rapidly saturate the available QAMs on the network, by providing an intelligent mechanism for recombination or consolidation of users onto existing or new microcasts based on, e.g., demographics/psychographics and profit considerations as well.

For example, consider the case where the NOC creates a new microcast or targeted stream for at least some new users submitting service requests. Assuming that each of these streams continues to be delivered while new ones are added, there will rapidly come a point where available bandwidth is used up, and no new targeted streams (or for that matter VoD sessions, etc.) can be added; the network is bandwidth constrained. In order to free up additional bandwidth without "dropping" subscribers, the NOC of the present invention can be used to evaluate the demographics/psychographics and cost/benefit of each proposed course of action (including adding a new microcast at possible expense of VoD or other requests, consolidating existing users on a fewer number of microcasts and remove the unused ones, or implementing other mechanisms to reduce bandwidth consumption, such as a shift to another more compressed encoding, or to SD with upconversion from HD, etc.). The aforementioned "intelligent" recombination or consolidation of subscribers onto a fewer number of microcasts based on common demographics/psychographics is a particularly useful way of freeing up bandwidth in such constrained environments while still maintaining desirable advertising and demographic/psychographic properties (i.e., having people watching programs/advertisements that are well suited to their demographics and/or personality from a revenue or "impressions" perspective). This is to be contrasted with a prior art broadcast switched approach, wherein programs are simply switched in or out based on whether one or more subscribers is watching or has requested them.

Targeted streams (i.e., those with advertising or other content directed to a particular demographic/psychographic or even particular network user) can be produced using a number of mechanisms. For example, in one variant, a digital advertising splicer of the type described subsequently herein can be used to splice the targeted content into a stream delivered to that user. Alternatively, one or more subscriber CPE can be directed to tune to an unused transmission channel for receipt of a substitute set of advertisements, such as via the targeting advertisement methods described in co-owned and co-pending U.S. patent application Ser. No. 10/639,070 filed Aug. 12, 2003 and entitled "TECHNIQUE FOR EFFECTIVELY DELIVERING TARGETED ADVERTISEMENTS THROUGH A COMMUNICATIONS NETWORK HAVING LIMITED BANDWIDTH," which is incorporated herein by reference in its entirety. Other approaches may be used as well, such as those described in U.S. Patent Application Publication No. 20020087976 to Kaplan, et al., previously discussed herein, and incorporated herein by reference in its entirety.

Figure 3B:
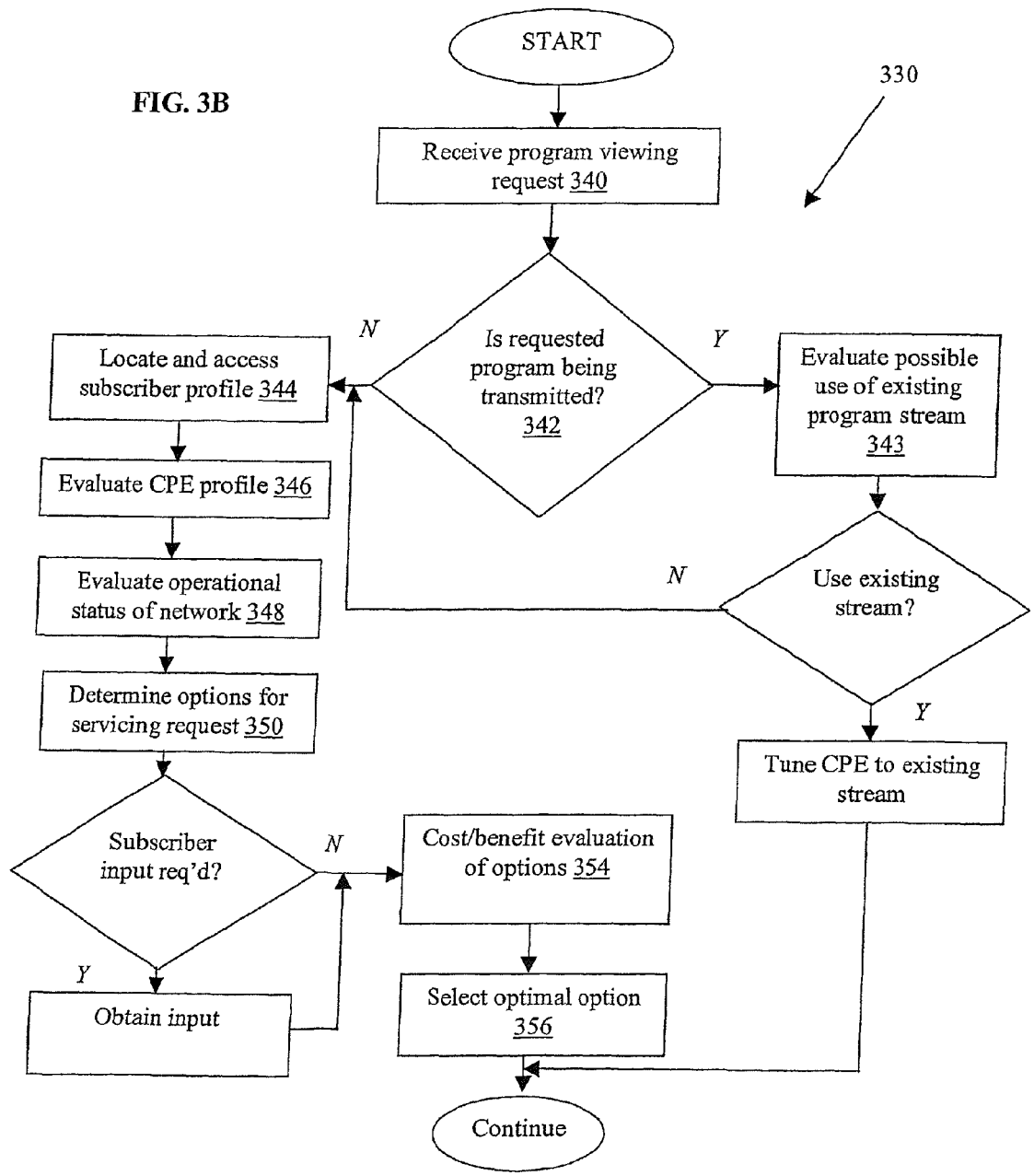
FIG. 3B is a logical flow diagram illustrating one exemplary embodiment of the method of FIG. 3.

FIG. 3B illustrates one exemplary implementation of the methodology of FIG. 3. The flowchart 330 shows a starting point 340 when the previously described NOC receives a program viewing request from a network CPE 106. In the next step 342, the NOC determines whether the program is currently being transmitted on the network. If the program is being transmitted, it gives the NOC an option to evaluate if the transmission can be shared with the CPE issuing request in step 340, per step 343. Next, in step 344, the NOC locates and evaluates the subscriber's profile (such as via an associated MSO billing or subscription database), and in step 346 the INC evaluates the relevant CPE profile. Such evaluations under steps 344 and 346 could include details such as how many tuners are available on the CPE, whether it has a DVR or mass storage, processing/RAM capabilities, the presence of a DCAS (downloadable conditional access system and associated secure microprocessor) of other CA environment, whether the subscriber belongs to a targeted advertisement demographic/psychographic group, the CPE's ability to receive DOCSIS or HD programs, decryption or codec capability of the CPE, and other well known parameters useful in setting up a program flow. Some of the profile details used in steps 344 and 346 may be available to the NOC by inquiring a network-side server or database (see discussion of FIGS. 4A-4D provided subsequently herein), while ether details may interactively be gathered from the CPE such as via polling, periodic upstream "update" communications, etc.

Next, in step 348, the NOC evaluates the operational status of the network. This evaluation includes, but is not limited to, checking on available bandwidth, available VoD server resources, available ingress resources for capturing and transmitting live video in the network, time of day, and/or any promotions, restrictions, or special handling requirements applicable to the requested program. Once the required information is collected in steps 342, 344, 346 and 348, in step 350 the NOC determines what options are available to fulfill the requested program. Such options include, but are not limited to, instructing the requesting CPE 106 to join an ongoing program flow (e.g., tuning that CPE to a switched-on BSA channel), setting up a new program flow for the request, rejecting request for lack of resources (such as by using the methods and apparatus described in co-owned and co-pending U.S. patent application Ser. No. 11/706,620 filed Feb. 14, 2007 and entitled "METHODS AND APPARATUS FOR CONTENT DELIVERY NOTIFICATION AND MANAGEMENT", incorporated herein by reference in its entirety, including for example notification of delayed delivery of services to the requesting subscriber), modifying some of the parameters of the requested program (e.g., supplying the requested content at a different bitrate, format or encoding, such as described in co-owned and co-pending U.S. patent application Ser. No. 11/881,034 filed Jul. 24, 2007 entitled "METHODS AND APPARATUS FOR FORMAT SELECTION FOR NETWORK OPTIMIZATION", which is incorporated by reference herein in its entirety), and offering promotional upgrades to or other special features associated with the requested program. The NOC checks in step 352 if some of these options require selection from the subscriber. If no subscriber input is required, the NOC evaluates in step 354 the costs to the network operator of the various program fulfillment options. Based on the rules put in place by the network operator, the NOC in step 356 selects the option that is optimized for the network (according to then-prevailing MSO selection/optimization criteria), and program fulfillment according to the chosen options follows thereafter.

It is also noted that the methods of the present invention allow for relatively precise counts of so-called "impressions" (loosely defined as presentation(s), "views" or "perceptions" by a subscriber, which may be correlated to a user action, or to revenue received by the MSO) to be gathered, and even to be used as feedback into the NOC decision algorithms so as to adjust future NOC decisions. In one embodiment, user impressions are used as a basis to group together or alternatively unpack particular subscribers within a microcast. The MSO can selectively shape its impressions-versus-revenue distribution as desired using the microcasting concept (e.g., adjusting the allocation of subscribers to particular microcasts in order to generate desired distributions, such as one-hundred "$1 impressions" versus one "$100 impression"). This allocation may be driven for example based on revenue considerations; e.g., where the MSO or their advertiser can derive a greater economic revenue from delivering a certain advertising or promotional content element to a larger number of less tightly coupled or targeted users as opposed to delivery of a more targeted advertising or promotion to a much small group of users, or vice versa. For instance, in a node comprising 500 subscribers, one of which is a notoriously heavy viewer and purchaser of goods or services, the MSO may opt to deliver very targeted advertising to that one select user, anticipating that the advertising "yield" (i.e., good or services purchased) from the impressions by that sole user will outweigh the yield from other uses of these assets within the network.

Moreover, such data can be used to provide enhanced advertisement billing and reporting; e.g., by detailing for a given advertiser how many microcasts their advertisement was placed into (correlated to how many impressions their advertisement received), and even the types of subscriber demographics/psychographics that the advertisement was delivered to. Specifically, in one embodiment, the NOC tracks how many subscribers are on a given micro cast or macrocast at any given time and stores this subscriber versus microcast/macrocast data, thus allowing for later distribution or analysis.

In some embodiments of the invention, optimization may also be implemented using input from the subscriber or the CPE 106 itself. For example, based on the then-prevailing network condition, the subscriber may be given a menu of choices (such as via an EPG or GUI interactive window generated on their display device), each choice being associated with a different per-view cost to the subscriber. For example, such choices could include: (i) joining an ongoing SD or HD program, (ii) starting a new SD or HD program flow for that user, (iii) viewing the requested program at a later time using "download and save" technique, or delayed notification as previously described herein, and so forth. The cost associated with each choice may be factored into the aforementioned optimization computation. A subscriber's choice may be based on explicit selection by the subscriber (e.g., having the subscriber affirmatively interact with the GUI menu or other interface), or by having a set of default choices stored for the subscriber either at the CPE or at a server or database in the network. Other options are possible, such as where the subscriber allows the MSO to decide the best options based on one or more optimization parameters provided by the subscriber (e.g., "always minimize cost" or "always select HD where available"). The aforementioned optimization may also be performed on a per-tuner basis, as opposed to a per-CPE or per-subscriber basis.

As another alternative, the user might be able to select between a "non-targeted" and "targeted" version of a program stream as previously described, whether for the same or different cost (as determined by the MSO). For example, as noted above, the MSO may decide as part of its optimization process to deliver a non-targeted version of a program stream (i.e., an existing BSA stream not specifically instantiated or tailored for that user), as opposed to creating a new stream that is (optionally) targeted to that particular user's demographic(s)/psychographic(s), such as to e.g., conserve bandwidth for another use such as a VoD session. However, if the user is willing to pay extra for the "targeted" stream, then this can be factored into the calculus performed by the NOC algorithms during optimization. For instance, the additional revenue generated from the user in this fashion might tip the balance in favor of instantiating the new targeted stream, since it might give the MSO more revenue than a VoD session using the same bandwidth.

Figure 6:
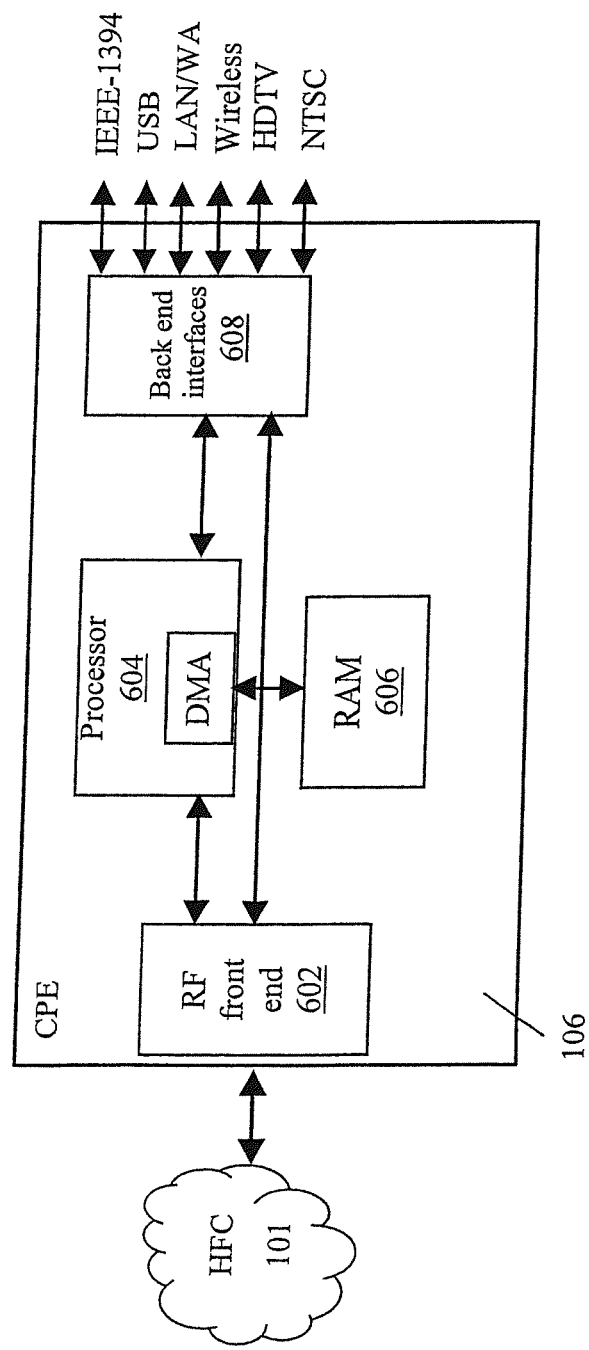
FIG. 6 is a functional block diagram illustrating an exemplary embodiment of CPE adapted to support network cost/benefit optimization functionality.

The subscriber's motivation in paying more for a targeted stream versus a "generic" stream might comprise the fact that the subscriber would receive advertising, promotions, and even to some degree content which was more suited to their particular demographic/psychographic (and hence ostensibly more useful and meaningful to that particular subscriber). For example, in a targeted stream, the advertisements and previews for upcoming programs would be adjusted so as to best cater to or satisfy that subscriber. Similarly, the subscriber can be given a preference configuration menu or other GUI via a client application (see discussion of CPE 106 related to FIG. 6 provided subsequently herein), wherein they can set their own personal "target" preference. These might include, without limitation, the genre or source of advertisements to be included or blocked (e.g., no feminine product ads, no ads from a particular vendor because they annoy the subscriber, etc., but as much golf-related content as possible), no transient on-screen promotional displays (e.g., small icons or moving animations at the bottom of the display), no channel identification icons on the display, and so forth. In effect, the subscriber would be paying for the ability to shape the content or "program space" delivered to them.

Similarly, in a passive variant of the foregoing, the NOC and/or client software application on the CPE 106 (see discussion of FIG. 6) may be configured to obtain and evaluate user historical tuning and demographic data associated with that CPE in order to shape a subscriber's program space without the need for affirmative input from the subscriber. Rather, data is compiled from the CPE (and optionally any registration, account setup, etc. information possessed by the MSO) as to user tuning habits, PPV or VoD requests, etc., and that information analyzed in order to shape the content delivered. For example, if the data from a particular CPE indicates that the subscriber has high persistence (i.e., few tune-away events) on the Golf Channel and golf-related advertisements, and comparatively lower persistence on most other subjects, then it can be assumed that the subscriber is at least somewhat interested in golf, and their program stream customized to deliver more golf-related content.

In terms of demographic/psychographic evaluation for purposes of inter alia stream generation, recombination or consolidation, several approaches may be employed. In one variant, a demographic or psychographic profile of the subscriber is used, comprising a plurality of data elements.

In the present context, a demographic generally refers to a statistic or categorization of a subscriber based on their physical or other attributes; e.g., 18-30 year-old college educated females living in urban areas. A psychographic, on the other hand, generally refers to a personality or behavior profile; e.g., the group of users who are "channel hoppers", who are impatient, or who become annoyed at too many advertisements in a row. This information might be gleaned from a subscriber's behavior (e.g., frequent tuning, low persistence), from a personality profile based on on-line purchases or websites visited, via a questionnaire the subscriber fills out, etc. These two factors (demography and psychography) can provide a powerful description of a given subscriber in terms of allowing targeting of content or advertisements that will "resonate" with that particular subscriber.

For instance, one such profile may include variables for age, sex, geographic location (e.g., zip code, state, city, or other demarcation), income level, stated or perceived topical areas of interest (e.g., golf, fishing, gardening, etc.), typical viewing hours (e.g., based on historical tuning data gleaned from that subscriber's CPE), tuning persistence (i.e., are they a "channel hopper" or not), primary viewing channels (e.g., a histogram or other distribution of viewing percentage per channel/program), and so forth. These may be encoded and retained in a data structure or record, such as an XML metadata file of the type well known in the programming arts, that is part of a NOC-local or headend database. For example, in one embodiment, the data structure comprises a table or file comprising the subscriber's CPE cryptographic one-way hash (see discussion elsewhere herein regarding anonymity) to identify the CPE/subscriber anonymously, and encoded variables for age, income, sex, etc., as illustrated in Table 1 below:

TABLE 1

HASH: 100010111010111110010011

| PARAMETER | VALUE | ENCODING |
|---|---|---|
| Age | 05 | 01 = 00-14 |
|  |  | 02 = 15-27 |
|  |  | 03 = 28-35 |
|  |  | 04 = 36-45 |
|  |  | 05 = 46-65 |
|  |  | 06 = >65 |
| Sex | 01 | 01 = Male |
|  |  | 02 = Female |
| Income | 03 | 01 = <20,000 |
|  |  | 02 = 20,001-45,000 |
|  |  | 03 = 45,001-75,000 |
|  |  | 04 = 75,001-150,000 |
|  |  | 05 = >150,000 |
| Location | 92127 | Zip |
| Viewing peak | 22:00 | GMT |
| Tuning persistence | 02 | 01 = Low = <60 sec. |
|  |  | 02 = Med = 60 sec.-5 min. |
|  |  | 03 = High = >5 min. |
| Primary channels | 002, 027, 142, 147 | Per EPG |
| HD capability | 01 | 01 = Yes |
|  |  | 02 = No |
|  |  | 03 = Upconversion |
| Subscription level | 04 | 01 = Basic |
|  |  | 02 = Basic Plus |
|  |  | 03 = Enhanced |
|  |  | 04 = Premier |

The data structure may also be made at least in part human-readable if desired, and also optionally accessible/searchable via a search engine for added flexibility. The previously described Boolean, Bayesian or Dempster-Schaefer, or fuzzy (e.g., variables such as "high income", "medium income", "low income", etc.) variables of the type well known to those of ordinary skill can be used to represent subscriber/CPE variables as well.

CPE and related equipment configuration information may also be included in a subscriber/CPE demographic data structure (record), in order to provide ready access for the NOC to CPE/equipment capabilities and configuration. For example, the record may include data such as CPE type, processor speed, memory (RAM) capacity, middleware type/version, error logging capability, presence of multiple tuners (e.g., via TUNER ID variable), MAC, HD decoding capability, and so forth. This information may be useful in, among other things, the NOC's analysis of whether to consolidate users onto certain streams. Specifically, if the NOC is seeking to recombine or merge two subscribers onto a given common program stream (such as in the aforementioned scenario where bandwidth is in contention), the NOC may not only evaluate the demographics of the subscribers to determine how good a "fit" they are, but also whether the two CPE are capable of receiving and decoding the current stream format. For instance, both users may not have an HD receiver or H.264 decoder, and hence cannot share an HD stream.

Moreover, the present invention contemplates the use of a stream demographic or characterization file or other such data structure. For example, when a user request for a given program is received, the NOC may decide to generate a new program stream that is tailored or targeted to that particular subscriber (assuming one does not already exist, and bandwidth is not in contention). At this time, the NOC process can create a stream characterization file which describes the various attributes of the stream from at least a demographic/psychographic perspective (i.e., the basis of how and why the stream was "targeted" in the fashion it was). Upon receiving subsequent program requests, the NOC can, if the request is for a program being carried on that existing stream, evaluate the requesting subscriber's demographic metadata file (previously described) and compare it to the stream characterization profile to determine if the subscriber should be tuned to that existing stream, or a new stream instantiated with e.g., advertising more targeted to the requesting subscriber spliced in.

Comparison of the subscriber and stream profiles can be accomplished readily by the NOC process, such as by use of an algorithm that "scores" the comparison on various attributes of interest. As a simple example, the algorithm might look for matches on several variables (e.g., age/age range, sex, income, etc.), and add up points for each existing match from the comparison, wherein if the total of all points exceeds a prescribed value, the two profiles are deemed a "match". Alternatively, a more incremental or granular approach can be used, such as where the degree of match is graded (e.g., if one age value is within one increment or value of the other, it will be assigned a certain percentage match, if within two increments, a lower percentage, and so forth), and used as an input to subsequent NOC processing based on other considerations such as cost/benefit, CPE configuration, etc. In this fashion, the MSO can utilize the NOC to grade various stream generation/recombination options depending on both network operational circumstances and subscriber demographics/psychographics (and yet other factors if so incorporated into the NOC logic).

As previously alluded to, recombination or consolidation of subscribers in order to allow removal of one or more existing streams within the network may be accomplished on a cost/benefit basis as well. As previously described, the decision to generate a new targeted stream, or alternatively tune the requesting subscriber to an existing stream, may be predicated on cost and benefit considerations, such as revenue or impressions generated by spawning the new targeted stream versus other uses of the bandwidth (e.g., to allow for another VoD stream, or more DOCSIS downstream bandwidth). Similarly, the decision on which existing stream to migrate subscribers to in the event a bandwidth contention situation is reached, and which stream(s) to remove, can be based on such analysis. For example, in one embodiment, demographic/psychographic analysis of the relevant subscriber population currently tuned to a given stream relative to a second stream can be employed in order to decide which of the existing streams will remain and which will be dropped. In one variant, a "highest total score" approach is utilized, wherein the demographics of a subscriber of interest is compared or correlated to those of a given candidate stream in order to generate a scoring of the overall correlation between the two. This process is repeated across all relevant subscribers, and a total correlation score or metric generated for each such candidate stream. The stream(s) with the highest total correlation score is thus retained, and those with the lowest score dropped, e.g., in order of increasing correlation as bandwidth constraints demand.

To the degree that the NOC or optimization process utilize subscriber-specific or CPE-specific data in its operation (such as for determining the aforementioned demographic/psychographic profile of a CPE/subscriber on the network, and gathering historical tuning or other operational data such as power on/off times, CPE capabilities and software installed, etc.), such data can optionally be protected so as to maintain subscriber privacy. For example, the MSO might use a mechanism to anonymously identify and associate the aforementioned data with particular CPE (and hence individual subscriber accounts). In one embodiment, subscriber identities are optionally protected by hashing or encryption of the tuner address or the like prior to logging and storage. The stored "hashed" address or other parameter (e.g., TUNER ID) and associated events are therefore not traceable to a particular user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity or configuration data within the historical database. See, e.g., co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, for exemplary implementation of such anonymous mechanisms. Accordingly, the MSO (or NOC itself) can evaluate individual CPE 106 according to an activity or configuration analysis gleaned from that particular CPE (i.e., on a per-CPE basis) if desired. The targeted advertising previously described can also advantageously be performed anonymously; i.e., the MSO or NOC may know that a given CPE 106 identified by a given hash is requesting a program stream, and that per the MSO database, the CPE with that hash is in the over-40, golf watching, white male demographic, but not who the particular subscriber is or where there premises is located.

Content Segmentation—

Various types of content segmentation technology may also be used consistent with the present invention. In a broad sense, content segmentation refers to the process where a content stream, or portions thereof, is segmented into smaller components. Packetization of content streams is one form of segmentation; however, at a more macro level, groups of packets correlating to segmentation boundaries may be formed so as to provide inter cilia convenient boundaries for insertion of other content. For example, one form of segmentation comprises segmenting a program stream at various locations within the stream corresponding to e.g., the beginning or end of a program, scene changes (such as where advertisements might be spliced in), or other logical boundaries. Alternatively, segmentation may occur based on a temporal scheme (e.g., a boundary or segmentation at every 5.0 minutes of content). Other approaches may be used as well, as will be recognized by those of ordinary skill in the art. Such segmentation techniques advantageously allow the content provider and/or MSO to more finely control the delivery of the content to subscribers, as well as to tailor the content stream to individual subscribers (or groups of subscribers) or situations. For instance, one use of segmentation allows an MSO or other entity to provide "branch points" or "jumps" within the flow of program material, much like branch and jump instructions are used to move within various portions of computer code running on a digital processor.

In one variant, the subscriber(s) may be given an input as to which or a plurality of options they would like to see (e.g., picking one or three different endings for a movie), with the branch point for the three different logical flows comprising a content segmentation point or boundary.

In another variant, subscribers may be given an option to skip over portions of the content streams or advertisements; the use of segmentation allows this skipping to be more precise, and obviates the need for subscribers to fast-forward and rewind until the achieve the exact location of the stream where the desired program content resumes.

Additionally, segmentation affords the content provider, MSO and/or subscriber the ability to treat or characterize different portions of content differently. For example, in one variant, the content provider (e.g., studio) may pre-segment a movie and associate descriptive metadata and temporal coordinates with each segment. Tagging or marking approaches may also be used; see, e.g., the exemplary "SceneMaker" video tagging approach of Gotuit Media Corp. (www.gotuit.com), which provides bookmarking and "deep-tagging" specific scenes found in videos posted to sites such as Google Video, YouTube, Dailymotion and Metacafe. Once a video is tagged, it can be shared on a partial basis; i.e., only tagged portions if desired, thereby eliminating extraneous or irrelevant material.

Hence, in one variant of the present invention, the movie or other content element is effectively cut up into a series of vignettes that are characterized from a topical or other perspective (e.g., "love scene", "car chase scene", etc.; "scenes with Nicole Kidman", "scenes inappropriate for viewers under the age of 17", etc.). Accordingly, the provider, MSO or subscriber may specify the treatment of different types or classifications of segments; e.g., by delivering content segments restricted to a certain class, genre, or scheme, and so forth.

Similarly, from the MSO perspective, the MSO NOC or other network process can direct individual network or client processes (e.g., a VoD SRM, software application running on a DSTB, etc.) to selectively branch, jump or skip over content based on analysis of the metadata including for example evaluation of the correlation of the target subscriber's demographic/psychographic profile in light of the metadata. For instance, where a given subscriber's profile (or alternatively a group's demographic profile) indicates that car chases and car-related subjects are popular or particularly well received, the NOC may cause the content delivered to this subscriber (or group) to branch or skip over poorly correlated advertisements or portions of a stream to those more highly correlated.

It will be recognized that the aforementioned segmentation of content need not necessarily occur at a logical or other boundary, or on a "scene" basis. For example, segments may comprise short segments of arbitrary or irregular length, such as sports "highlight" clips lasting 10 seconds or so, or clips from live events such concerts, wherein a segment might comprise the live performance of a song, which can obviously vary in length from one song to another, or even one performance of the same song to another.

It will also be recognized that such metadata may be supplied by the subscriber or user, such as in the form of user-specific "personalizations"; see, e.g., co-owned and co-pending U.S. patent application Ser. No. 11/811,953 filed Jun. 11, 2007 entitled "METHODS AND APPARATUS FOR PROVIDING VIRTUAL CONTENT OVER A NETWORK", which is incorporated herein by reference in its entirety, for exemplary methods and apparatus for metadata insertion consistent with one embodiment of the present invention.

Network Costs—

As previously discussed, the "cost" of fulfilling a given program request may include the additional bandwidth required to service the request. A different bandwidth cost may be associated with each segment of the network. For example, when a CPE requests a VoD program located at a headend server (such as a VoD server 105), the cost associated with setting up the session and resulting content flow includes the cost of adding bandwidth between the headend and any intermediate hubs in the delivery path, as well as another component of cost associated with allocating bandwidth on the coaxial part of the network from an edge QAM device to the requesting subscriber's CPE 106. For example, CPE connected to the same hub may be able to share a program in the core network and on the connection from hub to premises, but CPE on different hubs may only be able to share a program at the core of the network (yet not downstream from the hub).

Additional "costs" to the network may also include the provision or generation of details such as: (i) the bandwidth occupied by the requested content, (ii) whether the content is requested by an application for immediate viewing, or whether the content is requested by an application for other purposes such as recording to a DVR, trickle or high-speed download, etc.; (iii) whether the program content is requested on DOCSIS network QAMs or digital television QAMs, and (iv) other practical details related to establishing a program stream within the BSA architecture. Another example of a network resource that may be consumed as a "cost" comprises the resources required to capture real-time content from sources such as national feeds, third party content providers, etc.

So-called "opportunity costs" may also exist and need to be considered in the evaluation of costs to the network for given delivery options. For example, if one option presents the MSO with an "either/or, but not both" situation, selecting one option over another may involve the loss, or possibility of loss, of revenue or other benefits to the network that might otherwise have been received. As an illustration of this principle, consider the logic described previously herein with respect to the example of FIGS. 3 and 3A; when bandwidth is constrained, and no new VoD sessions can be created if a new BSA stream is instantiated, there is necessarily an opportunity cost for the loss of the VoD session that could have otherwise been created.

In addition, real-time acquisition (RTA) costs associated with obtaining content streams (e.g., VoD streams) may exist for the MSO. These costs can be very significant, and generally are a function of the number of streams acquired.

It will be appreciated that in the context of the present invention, the impact of "costs" accrued by the network during operation can to some degree be mitigated through the use of timely clean-up or "reaping" processes. Such processes are well known in the art, and typically computer programs or processes that are used to recover assets for other uses when they are no longer required by the prior use. For example, one such reaping function comprises the broadcast switched architecture (BSA) controller function previously described, which in one variant switches off channels being delivered over the BSA switch when they are no longer being watched by any subscriber within the designated service group or area. This frees bandwidth for delivery of other channels or uses. Similarly, timely termination of a VOD session after completion frees up bandwidth for other sessions or uses. Hence, by ensuring that such reaping processes are employed effectively and aggressively, the MSO can avoid situations where costs associated with particular courses of action are open-ended; i.e., the costs can be terminated promptly when there is no longer a need for the service associated with the cost.

As discussed earlier, the impact of additional CPE requesting content from the network could comprise either a burden to the network operator's available resources, or no additional burden (such as where the program stream already exists). In terms of revenue or other derived benefit, the addition of a CPE content request might produce either some positive benefit (such as e.g., increased advertising revenue) or no additional benefit. The features and advantages of the present invention are now explained further through use of an example based on these two network factors (i.e., cost and benefit).

Many varying business models exist describing how a network operator will collect advertisement revenue based on the content watched by network subscribers. For example, a so-called "flat rate" model describes the situation where the operator obtains revenue from offering programs or advertisements regardless of how many subscribers watch which programs or advertisements, and when. Another business model comprises the operator making available targeted advertisement insertion capability, such that the operator's revenue from targeted advertisements increases when (more) subscribers watch a particular program.

Additionally, various service tiers or configurations may exists in a network, and users may be paying different subscription rate or per-program subscription fees depending on e.g., the variety of different ways to deliver the program including VoD, real time or trickle-in, high definition (HD) or standard-definition (SD), commercial free or not, PVR/DVR capability, and so forth.

Based on the foregoing, when a user requests to view a particular program, the network operator may be faced with determining the best possible way in which to satisfy the user request, while minimizing burdens on or costs to the network (and maximizing benefits to the operator, such as revenue or profit).

Network Revenue Opportunities—

As previously described, the NOC process comprise algorithms that impose various rules in an attempt to optimize the net cost/benefit trade-off associated with fulfilling a particular program viewing request (or alternatively, groups of requests considered collectively). On the "debit" side of this optimization process is the use of network resources such as available bandwidth, switch capacity. On the "credit" side, the NOC process may attempt to maximize revenue potential (or profit, which may or may not be associated with maximizing revenue) in fulfilling the program viewing request. For example, some of the CPE 106 in the network may be designated to receive targeted advertisements. Such CPE may additionally be classified in various demographic/psychographic segments of categories such as for example based on their spending abilities or income, particular actual or projected preferences (e.g., sports, music, literature), historical tuning habits, their subscription tier, geographic location, personal attributes (sex, age, race, etc.), available CPE hardware and software details (such as whether the CPE has multiple tuners, a hard drive, both DOCSIS and in-band tuners, a DVR capability, etc.).

For example, when available network bandwidth is plentiful, the NOC may impose a rule that uses additional bandwidth to fulfill a program request from a subscriber (such as by instantiating a new program stream) because the individualized transmission to that subscriber result in incremental revenue generation due to delivery of one or targeted advertisements or content to one additional subscriber. Note that as used in the present context, the term "targeted advertisement or content" includes without limitation both (i) advertisements or content that are particularly inserted based on the demographics/psychographic of that particular CPE/subscriber, and (ii) advertisements or content that are particularly targeted at a demographic/psychographic a priori, irrespective of whether a particular viewer or CPE is tuned to that advertisement or content. For instance, an MSO might obtain the aforementioned incremental revenue benefit because by creating a new program stream and inserting advertisements that are particularly selected for the demographic associated with the requesting subscriber (e.g., advertisements for graphite golf clubs placed in the stream of a white male over age 40 who watches the Golf Channel frequently), or alternatively by creating a new program stream with predetermined advertising that is not particularly selected for a given CPE/subscriber, yet which matches the requesting CPE's subscriber demographic anyway.

As network bandwidth utilization increases, and available bandwidth is at a premium, the same subscriber in the foregoing example might be made to share the program transmission with another user, thereby saving network bandwidth at the expense of foregoing additional targeted advertisement revenue opportunity. For instance, the MSO (or NOC) might determine that allocating the bandwidth saved by not instantiating the new BSA stream and instead allocating it to a VoD session will produce a greater revenue.

Another example of revenue opportunity may be illustrated as follows. When a subscriber requests to watch a program, the NOC may offer the subscriber a choice between broadcast version of the program, which the subscriber will start watching from that time onwards, or a cached version of the program that may be viewed from the beginning (e.g., VoD) so that the user does not miss any part of the program. The latter option may generate more revenue for the network operator.

Yet another example of network revenue opportunity includes opportunistically offering subscribers free previews of premium programming, when such program is being carried on the network. This revenue opportunity therefore has the potential of generating revenue by tempting the subscriber to upgrade to the higher service tier (or ordering the previewed content on a situational basis, such as PPV) without expending any additional network resources. For instance, when a high definition (HD) program is currently available on the network because it is being transmitted to a subscriber paying for the HD service tier, a second subscriber requesting standard definition (SD) copy of the same program may be offered a promotional viewing of that program in HD if the second subscriber's CPE supports HD reception.

Or, the MSO might decide to forego delivery of a second BSA stream with targeted advertising for the requesting viewer in favor of using that bandwidth to deliver promotional content (such as a new release or first-run movie only available on the premium service tier) in order to entice other subscribers into signing up for the premium service tier, while servicing the original subscriber's request with an already instantiated (albeit less "targeted") BSA program stream.

Similarly, the MSO might decide to trade an HD program stream that has been requested for use of the bandwidth for other purposes, and deliver an SD version of the requested program stream (or an "upconverted" version; see, U.S. patent application Ser. No. 11/881,034 entitled "METHODS AND APPARATUS FOR FORMAT SELECTION FOR NETWORK OPTIMIZATION", previously incorporated herein, for exemplary methods and apparatus for determining capability for and delivering "near HD" via upconversion technology). In one such variant, the NOC control logic is structured so that the determination of upconversion capability in a given CPE requesting an HD stream is performed before making a bandwidth allocation decision; if the requesting CPE has upconversion capability, an SD version of the requested stream will be supplied, and the "saved" bandwidth that would have otherwise been used to instantiate an HD stream used for other revenue-enhancing purposes. In another variant, the NOC control logic is configured so that the decision to supply the requested HD format or SD instead is governed at least in part by the number of subscribers in the relevant service group (or other relevant subportion of the network) requesting that same content and format. For example, where a request for HD comprises the first such request in the service group, and the requesting CPE 106 has upconversion capability, then the NOC would decide not to instantiate a new HD stream, but rather tune the requesting CPE to an existing SD session (or instantiate an SD session as needed). However, when several requests for the HD format of the program were received within the service group (and optionally one or more of the requesters determined not to have upconversion capability), then the NOC would create a new HD stream to service these requests. Moreover, the methods described in U.S. patent application Ser. No. 11/881,034 entitled "METHODS AND APPARATUS FOR FORMAT SELECTION FOR NETWORK OPTIMIZATION", previously incorporated herein, could be employed if desired to consolidate viewers onto the newly instantiated HD channel; i.e., by identifying viewers that have HD capability (i.e., an HD receiver, and display), and then migrating them over to the new HD channel from their extant SD channel. This latter approach allows, when no further viewers are left on the SD channel, removal of that channel (and hence bandwidth conservation).

A network operator may add further revenue opportunities based on the business goals and available network resources. Such additional revenue opportunities can be implemented for example using a rules-based software engine implemented in the NOC or at another node of the network (or even distributed across the network, e.g., in a plurality of linked but substantially autonomous processes), as described in greater detail below.

Exemplary Optimization Rules—

To further illustrate the various principles of the present invention, a detailed example of a rules-based optimization process that might be implemented in an MSO network is now described.

Assume, for example, that establishing a new program flow within the network costs $C_1$ dollars/Mbps when the network is less than 80% utilized, and 50% higher (i.e., $1.5C_1$) when the network is above 80% utilized. Moreover, assume that SD programs are available at a 1 Mbps bitrate, and HD programs are available at a 6 Mbps bitrate. Adding a new CPE 106 to an existing program stream costs a fixed cost $F_0$. Also, providing a unicast program with targeted advertisements inserted to a premium subscriber generates $D_1$ dollar revenue for the network operator. In addition, network costs are scaled by a factor of $F_1$ depending on the time of the day—such that network bandwidth (and prospectively other resources) becomes more expensive in prime-time compared to off-peak hours.

When a program viewing request is received, the NOC will use the exemplary optimization rule generally as follows:
1) Depending on the time of the day, determine whether to apply factor $F_1$ or not;
2) Determine whether network utilization is above or below the critical "threshold" (e.g., 80% in this example);
3) Determine if the program requested is SD or HD;
4) Determine if the request is made by a CPE in a premium subscriber's premises (or one associated with another target classification or tier); and
5) Select the option that optimizes cost/benefit for the MSO.

For example, assume that: (i) the cost of carriage is 1 cent/Mbps, (ii) the cost of tuning additional CPE to an ongoing program is $F_0$ or 0.5 cents per CPE 106, (iii) revenue from targeted advertisement program is 5 cents/program, and (iv) the multiplication factor $F_1$ described above is 1.2. If the network receives an HD program viewing request during prime-time when network utilization is above 80%, the cost of fulfilling the request by setting up a unicast transmission will be 6 (Mbps for HD)×1.5 (network utilization above 80%)×1 (cents per Mbps)×1.2 (prime-time scale factor)=10.8 cents. The revenue from targeted advertisement will be 5 cents, and hence the net cost/benefit is (+5 cents−10.8 cents) =−5.8 cents. A second option will be for the network operator to make the requesting CPE join an ongoing flow of the same program. In this case, the cost to the network will be 0.5 cents, but there will be zero revenue potential because the network operator has lost the targeted advertisement potential. Hence, the net cost/benefit to the MSO would be (−0.5 cents+0 cents) =−0.5 cents. Therefore, in this example, the second option may be more desirable as it results in less net cost (only 0.5 for fulfilling the viewing request). Even if the loss of the targeted advertising revenue is viewed as an opportunity cost (i.e., net cost/benefit is (−0.5 cents−5 cents)=−5.5 cents), the second option is still preferable (−5.5 cents versus−5.8 cents).

If on the other hand, the above viewing request is received during non-prime time and when network bandwidth utilization is below 80%, the cost of setting up a new flow drop to 6.0 cents, but the revenue potential will still be 5 cents (and a net cost of −1.0 cents), making this option much more attractive to fulfill the viewing request, since it is competitive with even the non-opportunity cost weighted alternative option described above.

Figure 3C:
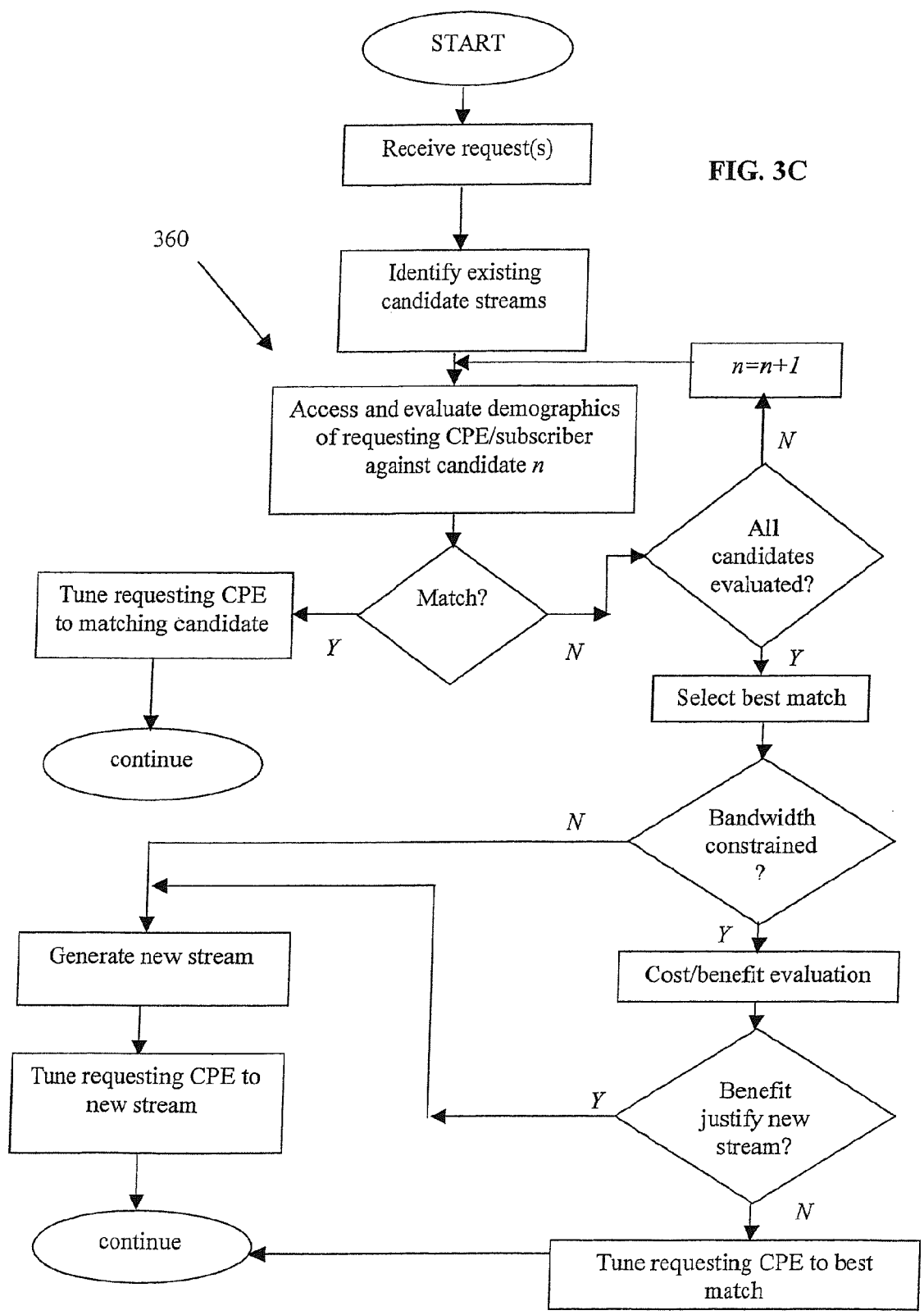
FIG. 3C is a logical flow diagram illustrating another exemplary embodiment of the cost/benefit optimization and program allocation methodology of the invention.

FIG. 3C illustrates yet another exemplary embodiment of the methodology of the present invention, incorporating various of the foregoing features and aspects.

Exemplary Message Exchanges and Protocols—

To further illustrate the various principles of the present invention, a detailed example of message exchange that might be implemented in an MSO network is now described. The exemplary message exchange may follow, inter alia, the SCTExxDVS629 standard, which is incorporated herein by reference in its entirety. The SCTExxDVS629 is a standardized and extensible message based interface defining a minimal set of cooperating logical services necessary to communicate placement opportunities, placement decisions, and placement related event data necessary for accountability measurements.

The SCTExxDVS629 standard comprises a minimal set of cooperative logical services needed to implement an advanced addressable advertising system. The logical services include Ad Management Service (ADM), Ad Decision Service (ADS), Content Information Service (CIS), Placement Opportunity Information Service (POIS) and Subscriber Information Service (SIS).

The ADM defines messages in support of advertising (or promotional) insertion activities. The message interfaces exposed by an ADM allow for both pre-configured advertising decisions as well as real-time fulfillment models. The ADM interfaces and messages are normatively defined in Part 3 of the aforementioned SCTExxDVS629 standard.

The ADS determines how advertising content is combined with non-advertising or non-promotional (e.g., entertainment) content assets. The decisions made by an ADS may be straightforward (i.e., specific advertisement content placed at a specific time in a specific asset) or arbitrarily complex (based on subscriber data, advertising zone, etc.). The ADS interfaces and messages are normatively defined in Part 3 of the SCTExxDVS629 standard.

The CIS manages metadata describing all the assets (both advertising assets and non-advertising assets) available to the other SCTExxDVS629 logical services. The CIS does so by providing query and notification interfaces to the other logical services. The CIS specification interfaces and messages are normatively defined in Part 4 of the SCTExxDVS629 standard.

The POTS holds, maintains, or retains descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension. The POTS is normatively defined in Part 5 of the SCTExxDVS629 standard.

The Subscriber Information Service manages all the per-subscriber information relevant to advertisement placement decisions. The SIS provides mechanisms surrounding privacy issues. The SIS is normatively defined in Part 6 of the SCTExxDVS629 standard.

Figure 3D:
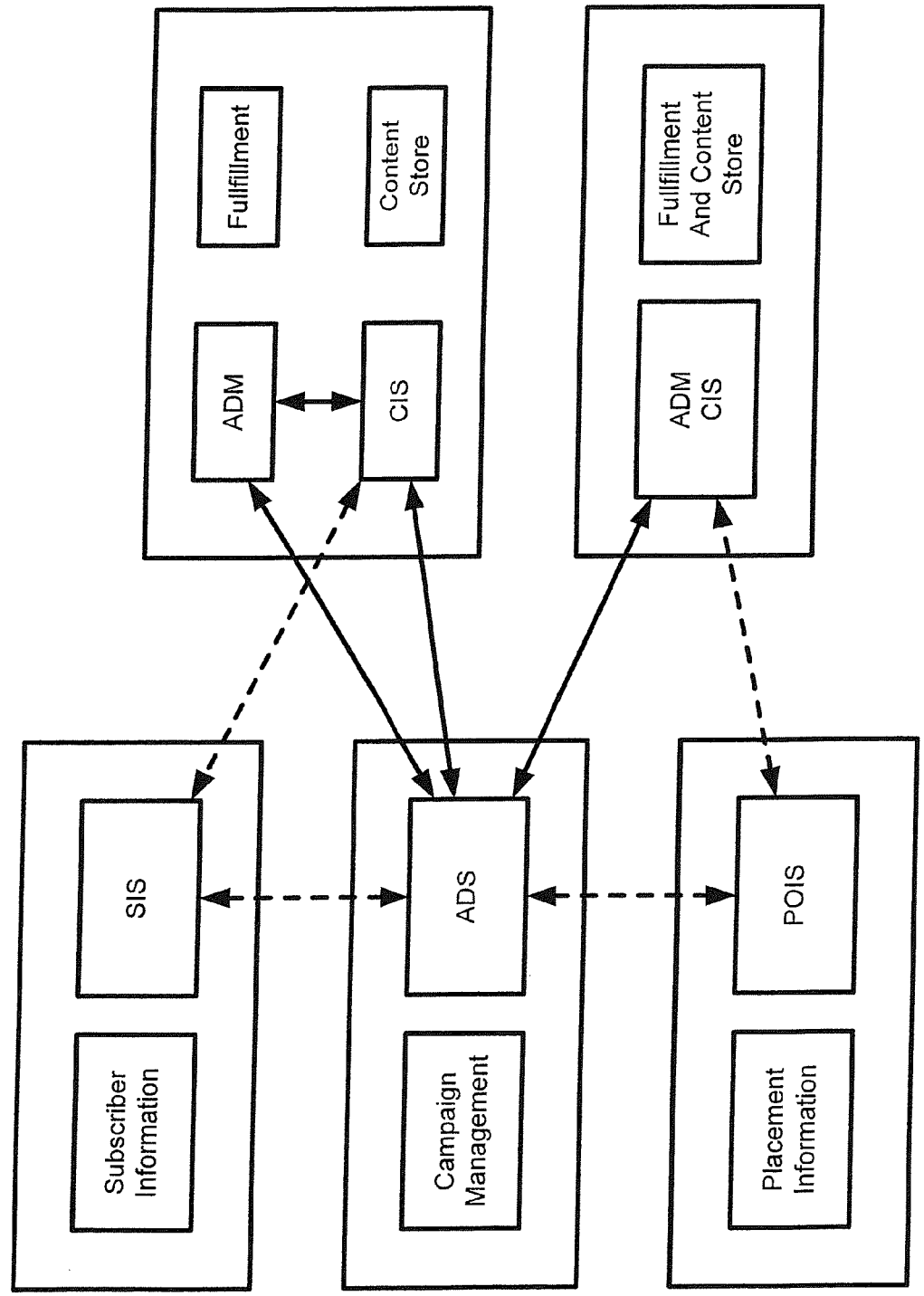
FIGS. 3D-3F illustrate various aspects of an exemplary message protocol useful with one embodiment of the present invention.

FIG. 3D illustrates an exemplary configuration with a number of variations of deployment among the services listed above. In one case an ADM is shown as a standalone service while in another an ADM and CIS are combined into a single physical server. It is appreciated that many other combinations, beyond the illustration given are possible. All communication lines shown in the figure are message sequences defined by the various parts of this standard and discussed in further detail below.

Figure 3E:
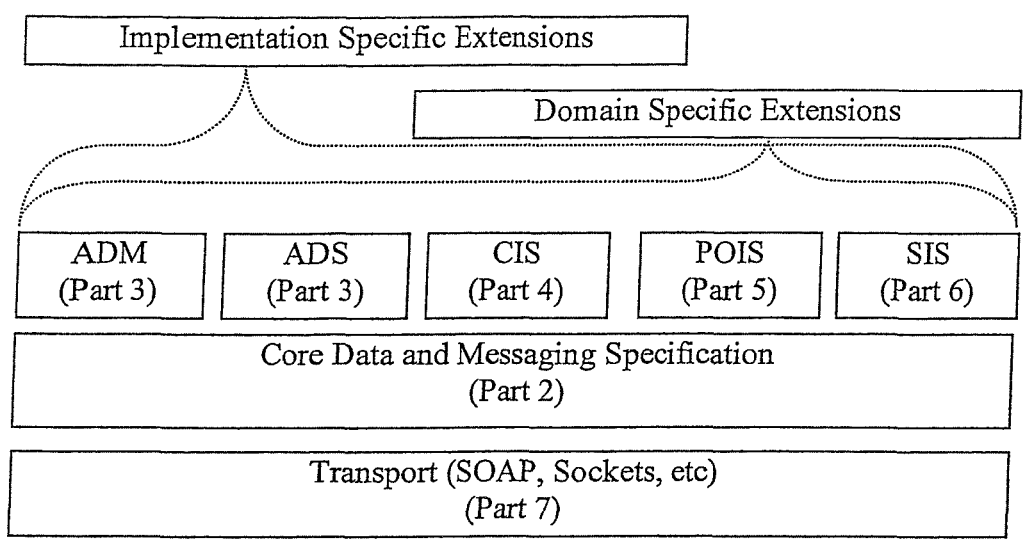

The SCTExxDVS629 further discusses core data types and extensible message framework which form the vocabulary needed to communicate among the defined logical services described above. These data types and message structure do not depend on any domain type (VOD, Linear Cable, SDV, etc.) or on specific advanced advertising functions (session based advertising, subscriber addressing, etc.). Rather, they are defined by the standard and are added as needed to address specific platforms and advanced advertising functions. Thus, an XML stack will be comprised of several layers including a Domain Specific Extension (DSE) detailing unambiguously which delivery platform is being utilized, such as VOD, linear cable, BSA, and advanced STB applications, etc. XML namespace versioning is supported and detailed in Part 2 of the SCTExxDVS629 standard. FIG. 3E illustrates generally the XML stack which is communicated among the logical services illustrated above.

All messages within the SCTExxDVS629 standard are defined as pairs—every message initiated by some logical system has a defined response. The messages may be request/response messages, notification/acknowledgement messages, service check messages, or service status messages. The XML message elements share a common attribute definition (though individual messages may contain additional attributes.

The exemplary XML messages of one embodiment are comprised of an Attribute Type, an Address Element, an AdType Element, an AssetRef Element, a Callout Element, a Content Element, a ContentDataModel Element, a ContentLocation Element, a CurrentDateTime Element, a Duration Element, an Ext Element, an ExternalStatusCode Element, a Note Element, Program Element, a SegmentationUpid Element, a SpotRef StatusCode Element, a Tracking Element, and a URI Element.

Figure 3F:
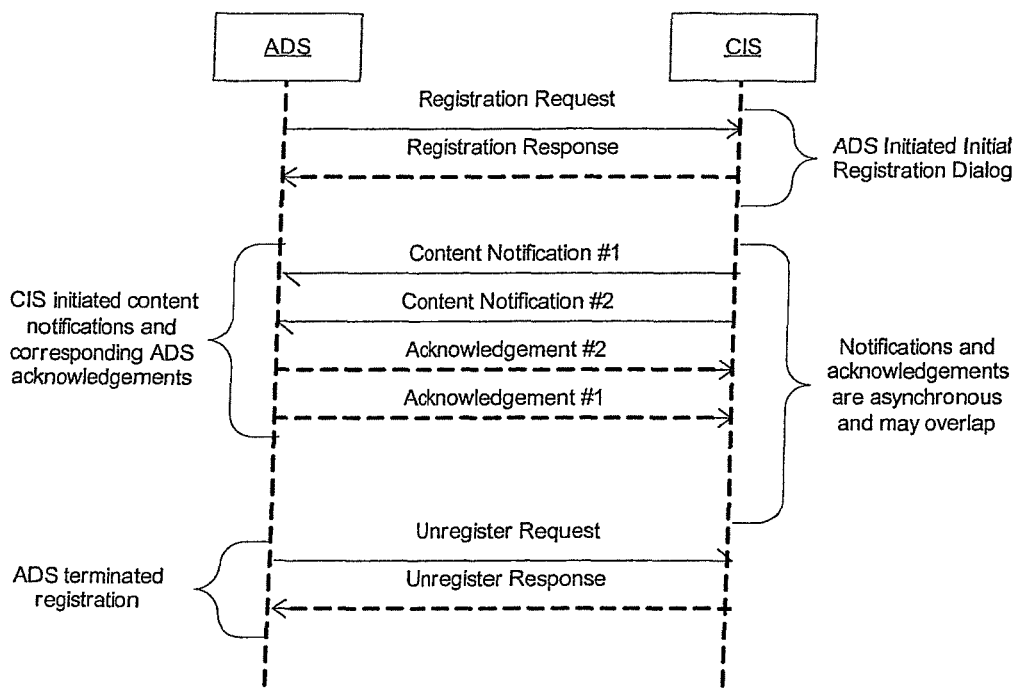

FIG. 3F illustrates a typical sequence of message pairs used in the foregoing protocol. In the example, an ADS initiates the communication by requesting to be registered to receive content notifications from a CIS. A logical service registers with some other service in order to establish ongoing consumption of the service provided. A logical service may subsequently deregister to remove itself as a consumer. Next, the CIS sends a response message to the ADS accepting (or rejecting) the request. The CIS then spontaneously sends notifications to the ADS as changes to the specified content occur over time. The ADS acknowledges each of these notifications but neither system is required to maintain synchronous threading of messages on the transport. All service messages are request/response pairs. Once a service channel exists between two complimentary services request/response or notification/acknowledgment exchanges can then occur per the defined interfaces.

Any logical service may issue a query to any other logical service at any time without previously registering to do so by sending a query request message (which asks for information). The requested information (or an error status) is returned in a query response message. Further, a logical service may also send/receive service status messages which to/from some other logical service with which it has previously registered in the event of a change in ability to perform the registered service. Further, service check messages may be sent on an ad hoc basis to determine, inter alia the availability of the service.

Thus through the mechanism described above, exemplary messages useful in implementing various functions of the present invention are exchanged. It will be appreciated, however, that various other methods or protocols of message exchange may be implemented consistent with the present invention with equal success, those described herein being merely exemplary of the broader principles.

In one variant of the invention, a placement request and placement response paradigm is used to provide separation between (i) the placement opportunity, and (ii) the placement decision that applies to that opportunity. In a typical transaction, one entity would generate a request (e.g., based on an existing or planned placement opportunity), and transmit this request to a second entity (or second internal process within the same entity, such as the aforementioned NOC), the latter receiving the request and evaluating it via e.g., decision logic or algorithms as previously described) to determine the appropriate decision. This decision may then be transmitted via the response to the originating entity, or another entity which (e.g., a proxy) which is tasked with execution of the decision.

In one variant, the aforementioned process is useful especially when information is not known until late in the content flow (such as in the case of an on-demand delivery model). For example, in a VoD delivery case, the aforementioned request/response exchange might occur during or as part of the session setup process.

The aforementioned approach also allows for preloading in at least three different respects, namely: (i) preloading of the decision in anticipation of the stream being established, so as to obviate any delays associated with obtaining or deriving the decision; (ii) preloading subscriber- and/or opportunity-related information (instead of having to make a "late" binding, determining in advance when there might be an opportunity available); and (iii) preloading or pre-scheduling applicable advertising or promotional content for that opportunity in advance of delivery.

Various interactions between the ADM and other components of the advertising or promotional subsystem of the invention are contemplated, including for example: (i) ADM/POIS; (ii) ADM/SIS; (iii) ADM/CIS; and (iv) ADM/ADS. Each of these exemplary interactions is described in greater detail below.

ADM/POIS—In one embodiment, the ADM may utilize or consume "placement opportunity" information from the POTS specifically to identify rights (e.g., access) and particular advertising types as they may relate to content, platforms, behavior, or some other identifiable opportunity to place an advertisement or other relevant content within a program stream. For instance, the ADM might request to know what types of services are available to it for a given opportunity or circumstance.

ADM/SIS—The ADM may also use or consume "subscriber" information to best match advertising or promotional content to placement opportunities based on events that may occur in the network. It may also send this information to an ADS to allow the ADS to make a more informed decision.

ADM/CIS—The ADM may also use consume "content" information to discover the presence and character of the content, as well as metadata that may describe it, so to best be able to fulfill decisions.

ADM/ADS—The ADM may take all the above information (i.e., when the opportunity exists, the content exists, the "addressability" from the SIS exists) and send that information to an ADS which may provide a "decision" that best matches MSO objectives (such as in accordance with an advertising or promotional campaign, MSO policy, rules engine, etc.).

Advertising Insertion Techniques—

In content-based networks such as cable television networks, advertisements (including without limitation promotions, commercials, and short segments) that are viewed by subscribers can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program stream. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

In terms of technology, three primary variants of advertisement insertion technologies exist: (i) analog; (ii) hybrid analog/digital; and (iii) digital.

Under the analog approach, programs are distributed as NTSC video and include analog cues (tones) to the MSO that signal the local operator to replace the national-level advertisements with locally-generated ones. Insertion equipment includes so-called ad-splicers and storage devices that is typically maintained in the MSO headend or other location. These analog systems, however, have limited capability and do not support advanced functionality such as detecting a program change (e.g., situations where the advertisement lineup should or could be changed due to a change in the content broadcast schedule, such as where a championship sporting event runs into overtime). Moreover, analog systems make targeted/addressable advertising insertion difficult if not impossible.

Under the hybrid approach, advertisements are stored in a digitally compressed or encoded format, e.g., MPEG-2, in local storage. Both the source (network) feed to the headend and the subscriber delivery channel can be either analog or digital. If the network feed is analog, embedded cue-tones are used to cue retrieval and conversion of the digital advertisement to analog. An analog splicer switches input from the network feed to the converted local advertisement. When completed, the splicer switches the input back to the network feed.

The analog output of the splicer is encoded to a digital format in the case that the delivery channel to the subscriber is digital. If the channel is digital, the analog output of the splicer is digitally encoded. If the network feed and subscriber delivery channel are both digital, both the program network feed and the advertisement are converted into analog prior to insertion of the advertisement. The analog content is then encoded back to digital before delivery to the subscriber. Unfortunately, the aforementioned conversion from digital to analog, and then back to digital, requires a high processing overhead and cost, and may significantly degrade video quality since the conversions are at least partly "lossy" in nature.

Under the fully digital approach, many of the aforementioned limitations are overcome. Several standards have been developed to implement such digital techniques, including SCTE 35 2001 (formerly DVS253), "Digital Program Insertion Cueing Message for Cable", and SCTE 30 2001 (formerly DVS380), "Digital Program Insertion Splicing API". These standards define splicing of MPEG-2 streams for digital content insertion (including advertisements), and create standardized communication protocols for the insertion of content into any MPEG-2 output multiplex in the splicer.

By keeping the process of local advertisement insertion completely within the digital compressed domain, as well as keeping this content in the compressed domain from the network operator to the subscribers, the quality of the network-supplied video and advertisements is maintained effectively intact.

Advantageously, the present invention can be used with any number of different advertising insertion or splicer architectures. See, for example, co-pending and co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE" (published as patent publication No. 20050060745 on Mar. 17, 2005), which is incorporated by reference herein in its entirety, for exemplary advertising insertion and splicer apparatus and methods in the context of, e.g., networked digital video recorder (NDVR) or VoD delivery paradigms.

In one variant, advertising insertion is accomplished by routing the network feed through a splicer. The splicer may be used to create multiple output versions of the network feed for a current advertising zone structure (e.g., CNN_Boulder, CNN_Denver). When an SCTE 35 cue enters the splicer on the network feed, the splicer generates a cue request to the advertising server management section (here, which includes the APCSM 401). The advertising server management section determines which advertisement or promotion to play, according to a schedule, as previously discussed. The advertising server management section then instructs the splicer to splice a content stream, and instructs a content server to play the selected advertisement or promotion at the designated time according to the schedule.

It will be appreciated that using this approach has several potential shortcoming relating to large numbers of streams and BSA "microcasts" as described herein including: (i) the extra copies of networks feeds are very static and there is no easy way to create or destroy them in this model; (ii) advertising splicers are relatively expensive to implement, at roughly $250-$500 per stream; and (iii) there is a critical timing issue between the advertising content streamer and the splicer.

In the context of an exemplary nPVR (network personal video recorder) VoD architecture that implements splicing, the networks are run through a statistical multiplexer (stat-mux) splicer for two reasons: (i) by always splicing in a default advertisement, a "splice point" is inserted in the compressed MPEG stream and this makes it trivial to split the content at the correct point; and (ii) the stat-mux clamps or adjusts the input feed to VoD encoding standards. The networks are fed to the VoD server (optionally through a device that splits the content into chapters and advertisements). The VoD server treats the input stream as a file once ingested (and may or may not be stored depending on the current acquisition rules for the program).

When a user (or the server in advance of a user request) requires a stream, a "session" is first set up. The difference between this session and a normal unicast on-demand session is that this session is assigned a multicast IP. The multicast IP allows many edge QAMs to join the stream versus directing the stream directly to an edge QAM in unicast IP mode. This session basically is a minimal delay "StartOver" session, essentially passing the real-time network feed through the VoD server. When an SCTE 35 cue is seen on the RTA input section, an SCTE 30 cue is sent to the advertising manager (ADM), which may incorporate the APCSM 401 described previously herein. As is well known, the ADM can be implemented externally to the VoD server, or internally to the VoD server. If located internal to the VoD server, the SCTE 30 message is not needed.

The ADM then selects an advertisement or promotion to play. In the case of the aforementioned BSA network (FIG. 1c) a DVS/629 or similar mechanism can be used to request a real-time match as to the best asset to play at this instant. This can be based e.g., on the number of viewers, demographics, geographies, psychographics, or whatever other information is available on the user or group of users that this feed is being delivered to, as previously described herein. The ADM then instructs the VoD server the name of the selected advertising or promotional content element to splice in. When the VoD server detects the appropriate splice point, timed by the SCTE 35 cue and the previously inserted default advertisement, it performs a playlist diversion between the RTA content and the selected content element. After the advertisement or promotion content finishes, the VoD server playlist diverts back to the RTA stream.

The use of a VOD server that performs network PVR as described herein can advantageously address the previously listed shortcomings (i)-(iii). Specifically, (i) VOD servers are specially designed to create and destroy sessions on a regular (and instantaneous) basis, and hence provide enhanced flexibility regarding setup and destruction; (ii) VOD streams presently cost on the order of $50 to acquire (as opposed to $250-$500 in the previously described approach); and (iii) the VOD server can maintain a locally stored or cached advertisement or promotion for ready recall, and can read directly from its content store when the data is needed so as to avoid any critical timing issues. Accordingly, the VOD server can handle many more streams than can literally racks of external splicers and content servers. Stated simply, using the VOD server as a splicer/stream generator for multicast feeds helps afford a highly economical hardware model for the implementation of BSA microcasting. While the aforementioned "dedicated" splicer approach may be used consistent with the invention, the repurposing of VOD assets provides a less complex and more elegant solution, and reduces RTA costs significantly.

Software Architecture—

Referring now to FIGS. 4A-4D, exemplary embodiments of the software architecture useful with the present invention are described in detail. It will be appreciated by those of ordinary skill that while four exemplary embodiments are described herein, other variations and combinations of the following architectures may be utilized depending on the desired attributes and network topology in use.

As shown in FIG. 4A, a first embodiment of the architecture comprises a network portion 402 of the NOC, which effectively functions as a supervisory process, and is in logical communication with a database 406, as well as other network equipment and processes (not shown) in order to effectuate the NOC process methods and policies as previously described. For example, in one variant, the NOC network portion 402 is in direct or indirect communication with a BSA switching hub process (not shown) in order to implement program allocation policies. The aforementioned network portion 402 may for example be combined with other network management entities (such as the entity 198 of FIG. 1C previously described), or may be stand-alone in nature.

As shown in FIG. 4A, not all "subnetworks" in the network need be included within the purview of the NOC 402; rather, the methodologies previously described may be implemented on a per-subnetwork (or per-node) basis if desired, although clearly the entire network can be included as well.

It is noted that in the embodiment of FIG. 4A, no dedicated client processes or portions (e.g., CPE software) are used; the NOC process 402 analyzes data it obtains from the database 406 (or other such sources) in order to derive its channel or program instantiation and bandwidth allocation policies. For instance, the NOC 402 may access the database 406 in order to determine a demographic/psychographic profile, historical tuning habits, codec capabilities, etc. for each CPE 106 of interest. The BSA server logs that are based on the client-server interactions as previously described may also be utilized for e.g., determination of a "predictive" program lineup for that node and/or estimation of predicted demand (see, e.g., co-owned and co-pending U.S. patent application Ser. No. 11/800,093 entitled "METHODS AND APPARATUS FOR PREDICTIVE CAPACITY ALLOCATION" filed May 3, 2007, and Ser. No. 11/243,720 entitled "SELF-MONITORING AND OPTIMIZING NETWORK APPARATUS AND METHODS" filed Oct. 4, 2005, each of the foregoing incorporated by reference herein in its entirety), or even indirect assessment of CPE configuration as described elsewhere herein. Hence, the foregoing methods can also advantageously be implemented in a predictive or "look-ahead" fashion, both in terms of what a given subscriber (or group of subscribers) may request in terms of programming, as well as future projected bandwidth demands and constraints (e.g., as a function of time of day, day of the year, and so forth).

Figure 4B:
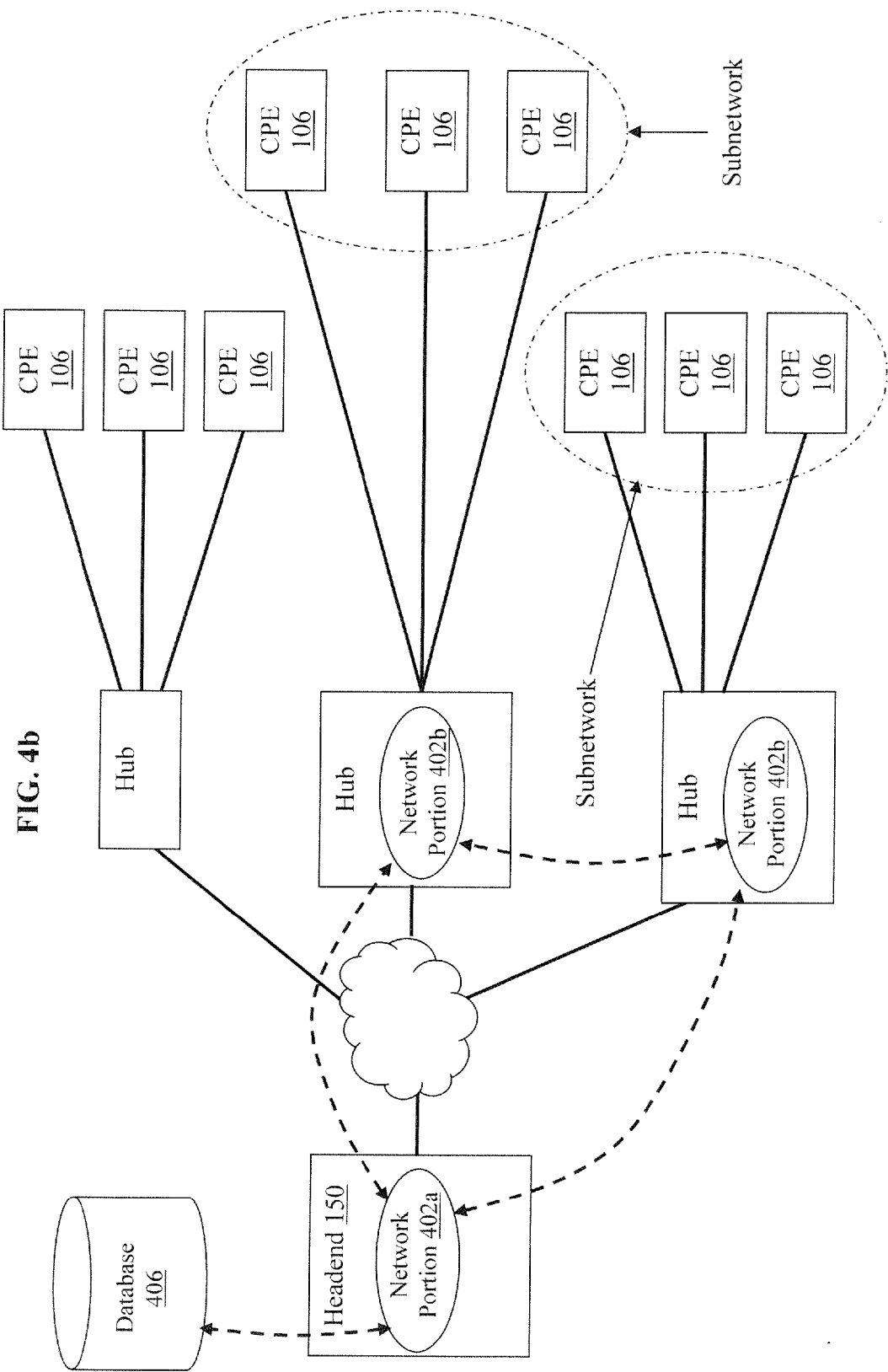
FIG. 4B is a block diagram illustrating a second exemplary embodiment of a network software architecture according to the present invention.

As shown in FIG. 4B, a second embodiment of the software architecture comprises a plurality of NOC network portions 402a, 402b, in this example disposed at the headend 150 and one or more hubs of the network, respectively. The various network portions 402a, 402b are in logical communication with one another (or at least the hub portions 402b with the headend portion 402a), thereby allowing for sharing of information. The aforementioned database 406 may also be used to provide information relating to subscriber profile and demographics/psychographies, CPE configuration, etc. as in the embodiment of FIG. 4A, thereby obviating the use of client portions within the network. Use of hub network portions 402b as illustrated also allows for a finer level of control; i.e., each hub process 402b can in one variant control program instantiation and bandwidth allocation in a substantially autonomous fashion from other hubs if desired. This is to be distinguished from the embodiment of FIG. 4A, wherein the hubs, while in one embodiment in communication with the headend process 402a, have no real innate "intelligence" of their own with respect to implementation of the program instantiation and bandwidth allocation methodologies previously described. Rather, the hubs (and other device) of the embodiment of FIG. 4A act merely as slaves to implement headend process policies or directives.

Moreover, in the event of a failure or problem with the headend NOC portion 402a, the individual hub portions 402b can continue to operate (and optionally communicate with one another directly), thereby providing a degree of fault tolerance and redundancy. To this extent, it will be recognized that another variant of the invention utilizes only the hub portions 402b (i.e., without the headend portion 402a) in this fashion, with either local individual databases, or logical connection directly to the "master" database 406 (not shown).

Figure 4C:
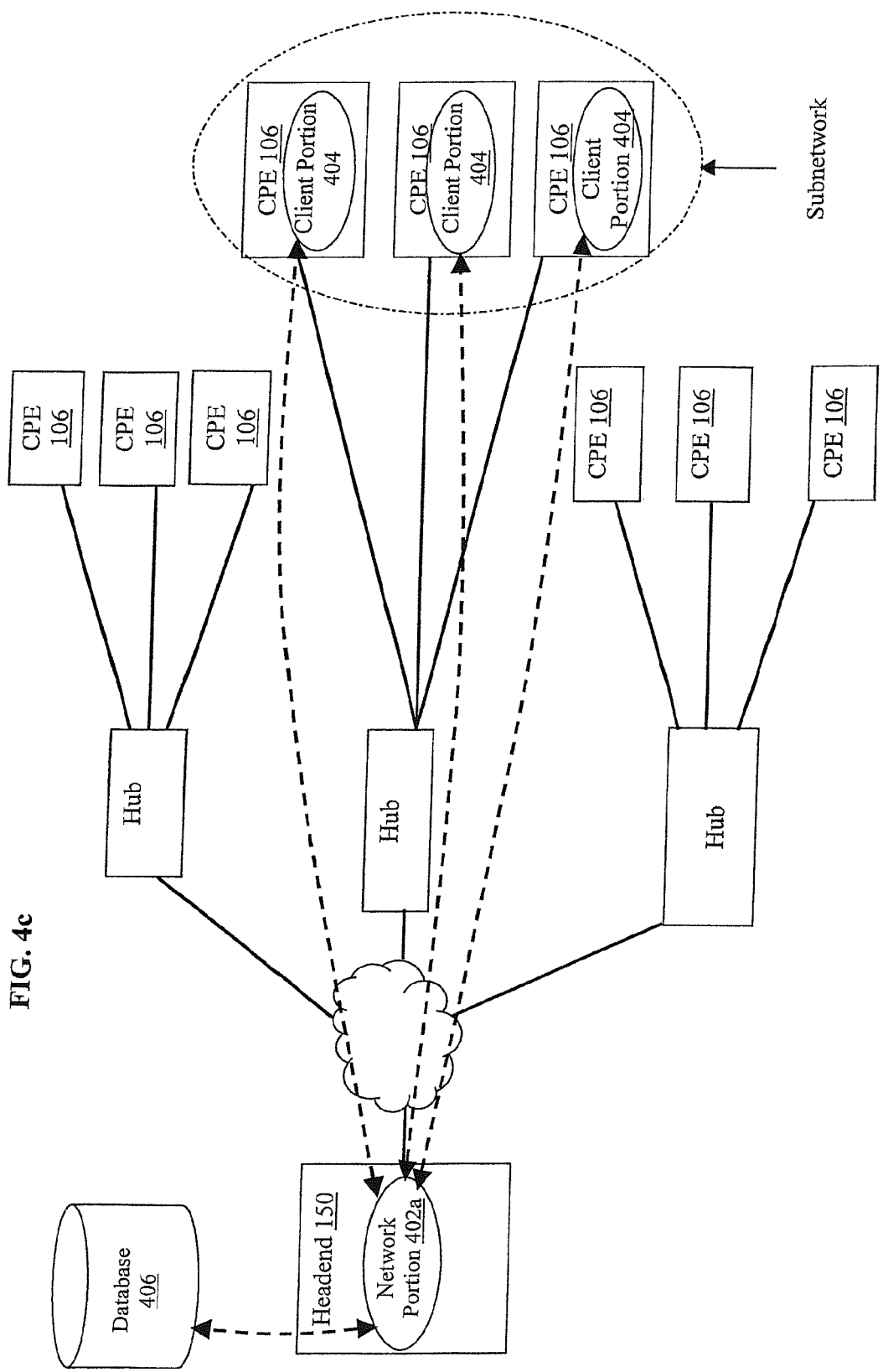
FIG. 4C is a block diagram illustrating a third exemplary embodiment of a network software architecture according to the present invention.

As shown in FIG. 4C, yet another embodiment of the software architecture of the invention comprises a headend NOC portion or process 402a in logical communication with client (e.g., CPE) portions 404 disposed on all or a subset of the CPE within the network. Such subsets may be organized based on subnetwork/node as shown, or using another scheme. These client portions 404 act as remote proxies for the headend NOC process 402a, allowing the MSO to control at least aspects of the operation of the CPE 106 having such client portions 404, including notably the collection of CPE configuration information, as well as historical data and tuning information from the CPE. This approach has the advantage that the MSO can gather much more accurate and relevant information about an individual CPE, including the operation thereof over time. For example, the headend NOC process 402a can periodically poll the client portions to determine operational status, what channel is currently being tuned to, recent errors that have been logged (e.g., inability to play a certain format of content, resource contention, etc.), and even invoke corrective action if desired. For instance, such corrective action might constitute download of a new codec or driver, and/or destruction of an existing application on the CPE. Modifications or upgrades to the middleware or monitor application can also be performed based on data gleaned from particular CPE. The client portion 404 can also be used to generate notifications, interactive displays or queries on the user's display device or other output device as previously described (e.g., delay notification, request for input regarding optimization/program selection options, etc.). Hence, the client portion 404 of FIG. 4C provides the MSO with a "point of presence" within each CPE as well.

Figure 4D:
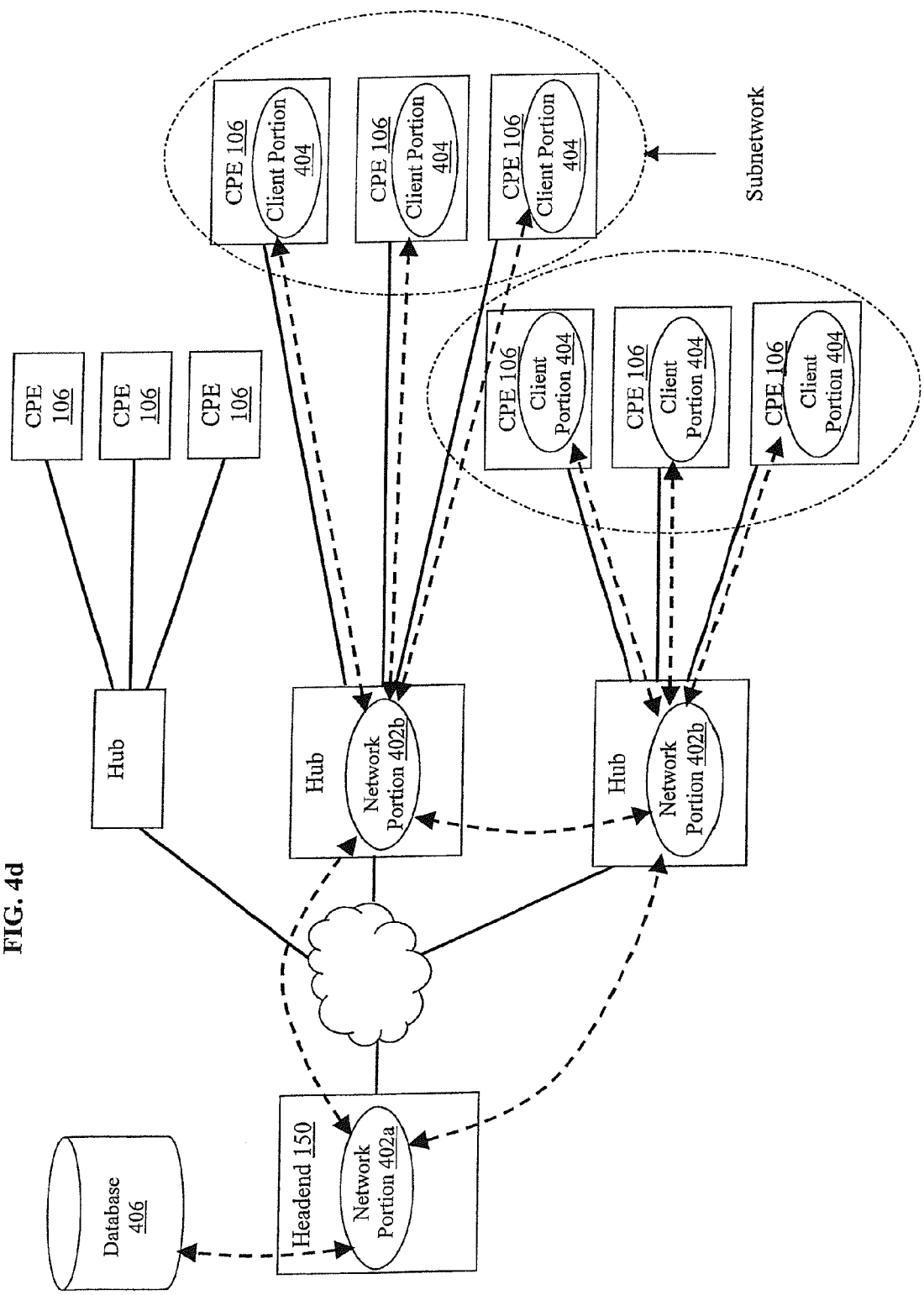
FIG. 4D is a block diagram illustrating a fourth exemplary embodiment of a network software architecture according to the present invention.

Referring now to FIG. 4D, yet another embodiment of the software architecture is disclosed, wherein both client portions 404 and headend/hub network portions 402a, 402b are utilized. This hybrid approach provides essentially all of the benefits of the embodiments of FIGS. 4B and 4C previously described, yet at the price of somewhat greater complexity.

It will be recognized that in certain implementations of the NOC (and other) software processes described above, there is a finite processing time required to process relevant information in order to provide the requisite output (e.g., selection of a particular option, cost/benefit metrics, etc.). Moreover, accessing relevant demographic, CPE configuration, or other such data will also consume a certain amount of time and processing overhead. However, there is also a desire by the network operator to mitigate any discontinuities or latencies associated with servicing subscriber requests, and hence a tension between servicing the request immediately and performing sufficiently detailed evaluation of the different options so as to make the implemented option(s) as effective as possible from a cost/benefit perspective.

Accordingly, in one variant of the invention, an artificial switching latency is imposed by the NOC so as to in effect give the NOC processing time to "catch up". For example, instead of an instantaneous switch occurring upon a user service request, a slightly delayed switch is used, with the user being visually (and/or audibly) alerted that their request has been received and is being processed, such as via presentation of an icon (e.g., hourglass or the like) on the on-screen display. The previous displayed content continues during this interval as well. When the NOC processing has been completed, the selected option is implemented such as by tuning to a new QAM, and the user's service request for new content satisfied.

In another alternative, a non-NOC based selection and switching logic can be employed initially upon receiving the user's request, and then the NOC-generated selection imposed thereafter. For example, under a traditional BSA switching model, the user's request for a switched-in channel (i.e., one being watched by another subscriber in the service group) would be satisfied by tuning the requesting subscriber to that existing channel, irrespective of any demographics, cost/benefit, etc. Alternatively, if no stream was currently being delivered (no on else watching), the stream would be instantaneously switched on, with little if any perceptible latency. Hence, under the current embodiment, this same conventional switching logic would be applied initially, until the NOC generated its selection output. At that point (say, for example one or two seconds after the initial request was serviced), if a change was required, then the change, e.g., switch to a newly instantiated "targeted" stream or the like, could be applied with little if any perceptible transient.

As yet another alternative, a pre-fetch mechanism of the type well known in the digital processor arts can be employed, such as where configuration, demographic, etc. data associated with a given CPE 106 can be fetched and locally cached in advance of an impending channel change request. For example, where a user has recently been "channel hopping", it is a reasonably safe bet from a statistical perspective that this behavior may continue. Accordingly, the aforementioned data necessary for the NOC to perform its evaluation and selection may be fetched and cached for a period of time (or until another event occurs allowing de-caching, such as a power-off event or the like), so as to expedite the NOC calculations. Such pre-fetch can be accomplished according to any number of different deterministic or speculative models, including for example: (i) recent historical tuning habits for that CPE; (ii) longer-term historical tuning habits (e.g., the subscriber almost always tunes to watch "24" on Fox every Monday night at 9:00 pm local time); (iii) anecdotal or event basis (such as where for example the CPE configuration data and subscriber demographic data is cached at a local NOC process upon power-up of the CPE, thereby indicating prospective user activity); (iv) periodic basis (e.g., such as where updated configuration and/or demographic data is periodically cached to replace older data, such as according to a schedule); or (v) on a statistical basis, such as with no prior knowledge of that particular CPE per se, but rather based on statistics for the requesting CPE's service group, hub, or greater network as a whole). Myriad other pre-fetch schemes will be recognized by those of ordinary skill provided the present disclosure.

Moreover, the physical configuration of the network can exploited so as to reduce NOC processing latency. For example, as discussed above with respect to FIGS. 4A-4D, a local NOC process (e.g., 402b in FIG. 4B) can maintain its own cache and database, thereby reducing the time and distance necessary to access relevant information. This approach also places the NOC closer to the relevant CPE within the network, also reducing intra-device communication latency should such communications be required (such as for an updated configuration profile).

In addition, pre-processing of data or content can be utilized within the network so as to reduce latency. In one embodiment, data relating to one or more subscribers of the network that is maintained (e.g., in a subscriber database, historical database for tuning activity, etc.) is accessed and pre-processed. For instance, in one variant, all or portions of the aforementioned cost-benefit calculations can be performed before an actual content request is received. Under one approach, the NOC algorithm performs a "tree" analysis for each of a plurality of possible options or scenarios that might occur from a given decision point. As an illustration, consider the case where a single user in a BSA network tunes to a program channel, and the NOC is faced with the decision whether to instantiate a new stream with targeted advertising for that particular user, or alternatively direct the user to an existing channel (ostensibly with less targeted advertising), and use the conserved bandwidth for another use such as one or more VoD sessions. The cost/benefit calculations associated with at least the VoD option can be performed by the NOC before the user tunes to that particular channel, and cached.

In another variant, the "targeted" advertising used for a particular subscriber or group of subscribers can be selected based on subscriber demographic or psychographic data (e.g., from a subscriber profile or database). For instance, demographic data for a subscriber can be evaluated and searched or compared against metadata associated with different advertising or promotional options, so as to select one or a plurality of candidates for use for that subscriber if/when a targeted stream (e.g., BSA stream, or VoD session) is instantiated in the future. This can be performed in advance of the subscriber ever requesting delivery of any content.

Bandwidth contention or restriction situations can also be pre-calculated to some degree. For example, various options for handling such situations can be considered, and some metric or indicia of the relative cost/benefit generated and cached for use by the NOC.

Pre-processing can also be performed according to an "intelligent" schedule; e.g., based on direct or indirect information regarding the subscriber's viewing habits. For example, it may be known that a given subscriber almost never watches television after 1:30 am on any given day of the week (e.g., by seeing zero tuning activity after that time historically, by a power-down status indication from the subscriber's CPE, etc.). Hence, the NOC can cease performing (and caching) any matches or results for that subscriber after 1:30 am, and devote itself to more relevant tasks. Similarly, when that subscriber is watching a VoD session, any BSA or other calculations are obviated, since it assumed that the subscriber will complete the VoD session. It will be appreciated that adherence to these rules need not be absolute; i.e., the NOC can speculate. So long as it is correct in its speculation ("hit") more often than not ("miss"), there is benefit to the system.

Hence, the present invention can make use of select pre-processing of various calculations (or portions of calculations) and/or caching of results in order to mitigate any latency in the selection and delivery process.

Network Device—

Figure 5:
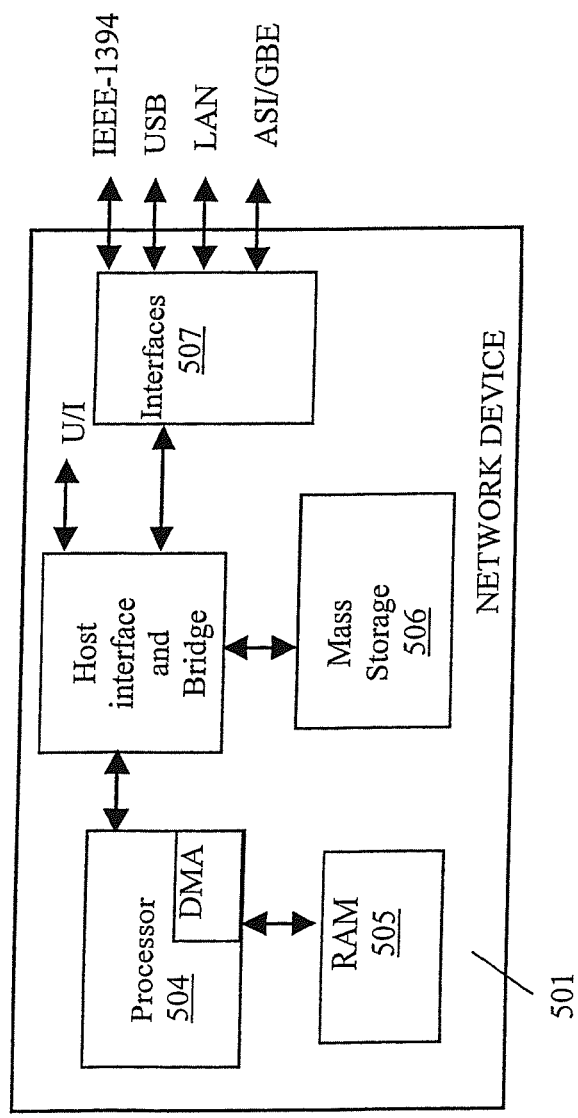
FIG. 5 is a functional block diagram illustrating an exemplary embodiment of a network device with cost/benefit optimization functionality according to the invention.

Referring now to FIG. 5, one embodiment of an improved network (e.g., control server) device with NOC optimization capability according to the present invention is described. As shown in FIG. 5, the device 501 generally comprises and OpenCable-compliant BSA network server or controller module adapted for use at the hub site of FIG. 1C, although the server may comprise other types of devices (e.g., VoD or application servers, SRM or other supervisory processes, etc.) within the network as previously described, including those at the headend 150.

The device 501 comprises a digital processor(s) 504, storage device 506, and a plurality of interfaces 507 for use with other network apparatus such as RF combiners, IP routers and other packet network devices, network management and provisioning systems, local PCs, etc. Other components which may be utilized within the network device 501 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the network device 501 and the CPE. The NOC process software (e.g., the hub portion 402b of FIGS. 4A-4D) is also disposed to run on the server module 501, and can be configured to provide a functional interface with the headend and/or client processes 402a, 404 on the network CPE 106 (where used), or other interposed or remote entities. These components and functionalities are well known to those of ordinary skill in the cable and embedded system fields, and accordingly not described further herein.

The device 501 of FIG. 5 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the device 501 may be a stand-alone device or module disposed at the hub or other site, and may even include its own RF front end (e.g., modulators, encryptors, etc.) or optical interface so as to interface directly with various portions of the HFC network 101. Numerous other configurations may be used. The device 501 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the format evaluation and selection functionality described above may take the form of one or more computer programs (e.g., the network and client processes, 402, 404). Alternatively, such computer programs may have one or more components distributed across various hardware environments at the same or different locations, such as where the network process 402 is distributed across multiple platforms at the hub site and the headend 150 as shown in FIGS. 4B and 4D.

As yet another example, portions of the functionality may be rendered as a dedicated or application specific IC having code running thereon. Myriad different configurations for practicing the invention will be recognized by those of ordinary skill in the network arts provided the present disclosure.

CPE—

FIG. 6 illustrates an exemplary embodiment of the improved CPE 106 according to the present invention. As shown in the simplified diagram of FIG. 6, the device 106 generally comprises and OpenCable (OCAP)-compliant embedded system having an RF front end 602 (including tuner and demodulator/decryptors) for interface with the HFC network 101 of FIGS. 1-1C, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter cilia, manages the operation of the device and applications running thereon (including the client process 404 where used). It will be recognized by those of ordinary skill that myriad different device and software architectures may be used consistent with the tuning functions of the present invention, the device of FIG. 6 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the client process 404.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned and co-pending U.S. patent application Ser. No. 10/723,959 filed Nov. 24, 2003 entitled "METHODS AND APPARATUS FOR HARDWARE REGISTRATION IN A NETWORK DEVICE"; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and U.S. patent application Ser. No. 10/782,680 filed Feb. 18, 2004 entitled "MEDIA EXTENSION APPARATUS AND METHODS FOR USE IN AN INFORMATION NETWORK", each of the foregoing incorporated herein by reference in its entirety. Myriad other combinations and variations of the CPE 106 will also be recognized by those of ordinary skill given the present disclosure.

The exemplary CPE 106 may further comprise its own indigenous optimization application, which allows a user to manage his optimization related preferences and selections, especially with respect to actual monetary cost incurred by his/her viewing habits and selections. Such management includes, but is not limited to, the ability to view cost optimization options to fulfill a program viewing request, and the ability to select from among these options. For example, the aforementioned CPE application program may, upon instantiation of a GUI (e.g., an on-screen display window with menu, as previously described), allow the window to display the relative costs of the different displayed options in relation to that particular subscriber's monthly bill or other useful metric. One such menu or display might advise the user that selection of an existing HD or SD channel will add no additional cost, whereas selection of a "PVR" or time-delayed version so that the user can view it in its entirety will add X dollars to their bill.

Also, as previously discussed, the CPE application program may allow the user to submit preferences regarding shaping or targeting their program space when such an option is selected.

Business Methods and "Rules" Engine—

In another aspect of the invention, the aforementioned NOC process 402 (e.g., rendered as one or more computer programs) optionally includes an operations and/or business rules engine. This engine comprises, in an exemplary embodiment, a series of software routines running on the network device 501 of FIG. 5 or other associated hardware/firmware environment that are adapted to control the operation of the optimization algorithms previously described. These rules may also be fully integrated within the NOC process 402 itself, and controlled via e.g., a GUI on a PC connected to the network device 501. In effect, the rules engine comprises a supervisory entity which monitors and selectively controls, via the NOC process 402 and/or CPE process 404, the network optimization functions at a higher level, so as to implement desired operational or business rules.

The rules engine can be considered an overlay of sorts to the algorithms of the NOC 402 previously described. For example, the NOC process 402 may invoke certain operational protocols or decision processes based on data received from the CPE 106 (e.g., historical activity data, CPE configuration, logged errors, etc.), as well as network operational or historical data, demographic data, geographic data, etc. However, these processes may not always be compatible with higher-level business or operational goals, such as maximizing profit on a network-wide basis (or after consideration of other factors not input to the NOC optimization algorithms, such as taxes, maintenance or repair costs, additional equipment leasing or use costs, etc.), or system reliability and/or flexibility. Moreover, the NOC may be operating on a per-CPE or per-request basis (i.e., evaluating each individual request effectively in isolation, and generating a decision or recommendation without considering larger patterns or decisions being made in the service group or network as a whole).

Hence, when imposed, the business/operational rules can be used to dynamically (or manually) control the operation of the NOC process 402 (and/or client process 404), in conjunction with the operational "recommendations" generated by the NOC 402 as part of its optimization functions previously described.

For example, one rule implemented by the rules engine may comprise selectively servicing (or at least queuing first) requests from certain users first; e.g., those with a higher subscription priority or level under bandwidth-limited cases, and only after this tier of users is satisfied, servicing any remaining content requests. In one variant, subscribers are divided into tiers (a hierarchy), and certain tiers of the hierarchy are serviced to a prescribed level first. For instance, one rule might impose a requirement that all "premium" subscribers have their HD program requests serviced before lower-tier subscribers; i.e., selectively skewing bandwidth allocation toward the premium subscribers so long as it would not prevent lower tier subscribers from receiving at least say SD-level service, or service at a prescribed minimum bitrate.

Another rule might allow for the relegation of low-priority requests to the back of the service queue; e.g., those associated with subscribers who have elected to receive content on a less-than-timely or delayed basis (perhaps in exchange for financial or other considerations). Such subscribers effectively do not care when they receive the content (within certain constraints, obviously), and hence the MSO can prioritize other requests first.

Similarly, capacity (e.g., bandwidth) for servicing requests can be allocated to those users which, e.g., based on demographics, historical patterns, geographic area, etc. will make best use of the bandwidth in terms of monetary return, profit, or some other business performance metric. For example, the MSO might invoke a business rule that selectively services requests for the best or most lucrative zip codes (or demographic slices) first, irrespective of the decision made by the NOC as to cost/benefit optimization. Such identification of certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

For example, in one variant, the rules engine is used to artificially add or remove constraints from the decision-making logic of the NOC. As previously noted with respect to FIG. 3, the presence of a bandwidth or other operational constraint may affect the NOC decision logic; e.g., the revenue calculations may be skewed if a lost opportunity cost (such as a VoD session that could have been instantiated but was not due to constrained bandwidth) is not considered. However, it may be that for the target zip code or demographic of interest, VoD produces no significant additional revenue, and hence the aforementioned decision process would be flawed if VoD opportunity costs were considered. Hence, the rules engine would selectively mask or disable VoD revenue input, or alternatively designate bandwidth as "not constrained", thereby removing this factor from the equation.

As another example, the failure of a network component, or loss of a content source, might render certain options unachievable (or at least undesirable due to factors such as high cost burden, high delivery latency, poor video quality, etc.). Hence, the rules engine can in such cases be used to mask the affected options or inputs to the NOC algorithm during the affected periods of time.

It will also be appreciated that the decisions generated by the NOC cost/benefit analysis can be manually or semi-manually utilized by network operators, such as in the form of a recommendation rather than a hard and fast decision point. For instance, the NOC may present a recommended choice or bandwidth allocation to a human operator, thereby letting the operator decide whether to implement it. This variant of the invention allows for the intangible but often important "gut feeling" or intrinsic knowledge of the operator to be factored into the decision process. The operator may also be able to identify trends or patterns in network operation that the NOC or rules engine cannot, such as the topical popularity of a given program (e.g., American Idol), in effect allowing the operator to override the NOC when his/her knowledge or intuition says that a different course should be followed.

Many other approaches and combinations are envisaged consistent with the invention, as will be recognized by those of ordinary skill when provided this disclosure. An example is the application of business rules based on content or content-provider related metrics versus those of the subscriber. For example, prioritization or servicing of certain requests might be based on one or more features or attributes of the content that is requested (i.e., the genre or type of movie, studio or source identity, actors, subject matter, presence or absence of metadata describing bandwidth profile of the content, etc.) as opposed to purely based on required bandwidth and/or revenue/cost. For example, in the aforementioned case of "American Idol", cost/benefit analysis by the NOC may indicate that new requests should result in new targeted streams being created, since the demographics associated with the individual CPE generating these requests are quite disparate. However, since most watchers of this program may in reality share a common demographic (e.g., mostly younger than age 35 and mostly female) despite what their subscriber registration accounts or CPE tuning habits say, creation of new streams would incrementally add little or nothing to increased revenue, and hence use of a common stream for all would detract very little from revenue.

Enforcement of the foregoing business rules may be executed by servers or other devices separately for each service (e.g. BSA or VoD) or centrally via the controlling actions of a master NOC, SRM (Session and Resource Manager) or other network agent.

In one embodiment, advertisers or even content providers (e.g., studios, networks, etc.) would pay a premium or provide other incentives to the MSO to have particular advertisements or content prioritized over others targeted to the same demographic. For example, where a targeted stream is instantiated, the MSO may program its rules engine to select the more lucrative of various advertiser's content (i.e., the one for which they receive greater payment or other consideration for using).

Similarly, a more incremental approach can be applied, such as where various advertisements or content are "graded" based on profit/revenue and/or operational considerations (i.e., those which earn most and/or give highest user satisfaction, etc. receive a higher grade), and the bitrate allocated based on such grade(s).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of operating a content delivery network having a plurality of consumer premises equipment (CPE) associated therewith, said method comprising:
   establishing a plurality of at least partly different program streams for servicing at least some of said plurality of CPE;
   receiving a request for program delivery from at least one CPE of said network;
   maximizing viewing impressions for a target advertisement versus a most profitable delivery option for servicing said request by said at least one requesting CPE by evaluating at least two possible delivery options for servicing said request, said act of evaluating comprising an analysis of each of said at least two possible delivery options based at least in part on an impression count for said target advertisement and at least one profit or revenue consideration relating to said network; and
   performing one of said at least two possible delivery options in order to service said request;
   wherein said at least two possible options comprise: (i) creating a new program stream for servicing said request, and causing said at least one requesting CPE to tune thereto; or (ii) causing said at least one requesting CPE to tune to a pre-existing program stream by migrating said requesting CPE from a first program stream having content which is logically correlated to a demographic associated with said at least one requesting CPE to a second program stream less logically correlated to said demographic than said first program stream.

2. The method of claim 1, wherein said act of evaluating is performed using at least a supervisory software process of said network.

3. The method of claim 1, wherein said act of evaluating further comprises an analysis of at least one operational consideration which comprises bandwidth availability.

4. The method of claim 3, wherein said act of evaluating is based on at least said bandwidth availability and selecting an option with an optimal cost.

5. The method of claim 1, wherein said method further comprises causing display of at least one graphic during at least one of said acts of evaluating and performing, said at least one graphic indicating to a viewer that servicing of said request is in progress.

6. The method of claim 1, wherein said act of maximizing further comprises evaluating a correlation of at least one demographic associated with a subscriber of said requesting CPE with said specific advertisement carried on said first and second program streams.

7. The method of claim 6, wherein said new program stream contains said specific advertisement that is less tightly correlated to said at least one requesting CPE based at least in part on demographic data associated with a subscriber of said requesting CPE.

8. A method of operating a content delivery network having a plurality of consumer premises equipment (CPE) associated therewith, said method comprising:
   receiving a program request from at least one CPE of said network;
   evaluating at least two possible options for servicing said request to determine a most profitable option versus maximizing viewing impressions for a target advertisement, said act of evaluating comprising analyzing at least one operational consideration, viewing impression count for said target advertisement, and at least one profit or revenue consideration; and
   performing at least one of: (i) creating a new program stream for servicing said request, and causing said at least one requesting CPE to tune thereto; and (ii) migrating said requesting CPE from a first program stream having content which is logically correlated to a demographic associated with said CPE to a second program stream less logically correlated to said demographic than said first program stream.

9. The method of claim 8, wherein said network comprises a broadcast switched architecture network, and said act of evaluating is performed by a software entity disposed at least partly at a switching hub of said network.

10. The method of claim 9, wherein said act of creating a new program stream comprises creating a stream having content at least partly determined based on a demographic associated with a user of said requesting CPE.

11. The method of claim 8, further comprising, when said new program stream is created, enabling at least one second CPE to join said new program stream based at least in part on an evaluation of a sufficiency of said new program stream for viewing by said at least one second CPE.

12. A method of operating a content delivery network, comprising:
   delivering at least first and second program streams to a plurality of user devices, programming content of each of said first and second program streams being tailored at least in part to one or more respective demographic variables;
   receiving a program request from at least one user device;
   identifying at least one projected bandwidth deficiency on said network;
   evaluating a demographic data file associated with a subscriber associated to said at least one user device, a stream characterization data file associated with each of said first and second program streams, and at least one revenue consideration of said network to maximize viewing impressions for a target advertisement versus a most profitable delivery option for servicing said program request; and
   based on said projected bandwidth deficiency, performing at least one of: (i) creating a third program stream for servicing said request, and causing said at least one user device to tune thereto; and (ii) selectively switching said at least one user device from said first program stream having content which is logically correlated to a demographic associated with said at least one user device to said second program stream, said second program stream being less logically correlated to said demographic associated with said at least one user device than said first program stream.

13. The method of claim 12, wherein said act of selectively switching comprises switching enough ones of said plurality of user devices to substantially mitigate said identified deficiency.

14. The method of claim 12, wherein said act of identifying said at least one projected bandwidth deficiency comprises:
   determining a projected available bandwidth for some time in a future period;
   determining a projected demand for said available bandwidth at said future period; and
   determining said deficiency based at least on said projected available bandwidth and said projected demand.

15. The method of claim 14, wherein at least one of said projected available bandwidth and said projected demand is based at least on historical data for said network.

16. The method of claim 12, wherein said act of selectively switching comprises consolidating a plurality of users of said network onto one of said first or second streams so as to permit removal of an other of said first and second streams from delivery.

17. The method of claim 12, wherein said act of evaluating said subscriber demographic data file and said steam characterization data file associated with each of said first and second program streams comprises evaluating a relationship between at least some demographic variables.

18. The method of claim 12, wherein said relationship between said at least some demographic variables comprises a graded correlation between at least some of said demographic variables.

19. Apparatus for use in a content delivery network for delivery of programming to at least one consumer premises equipment (CPE), said apparatus comprising:
   a processor;
   a storage device;
   an interface in data communication with said processor and said storage device, and at least one computer program configured to run on said processor, said at least one program comprising a plurality of instructions which are configured to, when executed, cause said apparatus to:
      deliver at least first and second program streams to a plurality of CPE;
      receive a program request from at least one CPE;
      identify at least one projected bandwidth deficiency on said network;
      evaluate a demographic data file associated with said at least one CPE, a stream characterization data file associated with each of said first and second program streams, and at least one profit or revenue consideration of said network to maximize viewing impressions for a target advertisement versus a most profitable delivery option for service of said program request;
      based on said projected bandwidth deficiency:
         create a third program stream to service said request, and cause said at least one CPE to tune thereto; or
         switch said at least one CPE from said first program to said second program stream, which is less logically correlated to a demographic associated with said at least one CPE than said first program stream; and
      remove said first program stream from delivery over said network.

20. The apparatus of claim 19, wherein said apparatus is further configured to cause said at least one CPE to tune to a Quadrature Amplitude Modulation (QAM) related to said third or said second program stream.

21. The apparatus of claim 19, wherein said apparatus comprises a control apparatus used in a broadcast switched architecture (BSA) network switching hub.

22. The apparatus of claim 19, wherein said plurality of instructions are further configured to, when executed, cause said apparatus to evaluate at least one operational consideration related to a cost of bandwidth allocation.

23. The apparatus of claim 22, wherein said plurality of instructions are further configured to, when executed, evaluate at least one operational consideration of said network.

24. The apparatus of claim 23, wherein said at least one operational consideration comprises bandwidth availability.

25. The apparatus of claim 19, wherein said plurality of instruction are further configured to, when executed, evaluate a correlation of at least one demographic associated with a subscriber of said at least one CPE with viewing impressions related to said specific advertisement carried on said first and second program streams.

26. The apparatus of claim 25, wherein said third program stream comprises said specific advertisement that is less tightly correlated to said at least one CPE based at least in part on said demographic data associated with said CPE.

* * * * *